(12) United States Patent
Cho et al.

(10) Patent No.: US 11,129,189 B2
(45) Date of Patent: Sep. 21, 2021

(54) METHOD FOR TRANSMITTING AND RECEIVING DATA IN WIRELESS COMMUNICATION SYSTEM AND DEVICE FOR SUPPORTING SAME

(71) Applicant: LG ELECTRONICS INC., Seoul (KR)

(72) Inventors: Heejeong Cho, Seoul (KR); Jiwon Kang, Seoul (KR); Heejin Kim, Seoul (KR); Ilmu Byun, Seoul (KR); Hyunjin Shim, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 569 days.

(21) Appl. No.: 15/999,735

(22) PCT Filed: Feb. 13, 2017

(86) PCT No.: PCT/KR2017/001543
§ 371 (c)(1),
(2) Date: Aug. 20, 2018

(87) PCT Pub. No.: WO2017/142270
PCT Pub. Date: Aug. 24, 2017

(65) Prior Publication Data
US 2021/0212111 A1 Jul. 8, 2021

Related U.S. Application Data

(60) Provisional application No. 62/297,145, filed on Feb. 19, 2016, provisional application No. 62/306,610, filed on Mar. 10, 2016, provisional application No. 62/309,952, filed on Mar. 17, 2016.

(51) Int. Cl.
| | |
|---|---|
| *H04W 74/00* | (2009.01) |
| *H04L 5/00* | (2006.01) |
| *H04W 72/02* | (2009.01) |
| *H04W 74/08* | (2009.01) |

(52) U.S. Cl.
CPC ......... *H04W 74/008* (2013.01); *H04L 5/0005* (2013.01); *H04W 72/02* (2013.01); *H04W 74/08* (2013.01)

(58) Field of Classification Search
None
See application file for complete search history.

(56) References Cited

U.S. PATENT DOCUMENTS

| | | | | |
|---|---|---|---|---|
| 9,210,711 | B2* | 12/2015 | Wiberg | ............. H04W 72/0486 |
| 2009/0086673 | A1* | 4/2009 | Aminaka | .......... H04W 74/0833 |
| | | | | 370/329 |

(Continued)

FOREIGN PATENT DOCUMENTS

| | | |
|---|---|---|
| EP | 2705720 | 3/2014 |
| EP | 2953390 | 12/2015 |

(Continued)

OTHER PUBLICATIONS

PCT International Application No. PCT/KR2017/001543, Written Opinion of the International Searching Authority dated May 22, 2017, 11 pages.

(Continued)

*Primary Examiner* — Anh Vu H Ly
(74) *Attorney, Agent, or Firm* — Lee, Hong, Degerman, Kang & Waimey

(57) ABSTRACT

The present invention relates to a method and a device for transmitting and receiving data by a terminal in a wireless communication system. The present invention provides a method and a device for: selecting a particular preamble from a preamble set; transmitting the selected particular preamble to a base station by means of resources on the frequency axis and resources on the time axis; receiving from the base station a response message comprising resource information that indicates resources allocated on the basis of a first random connection target of a first (Continued)

terminal; and transmitting, to the base station by means of the allocated resources, verification information of the first terminal for uplink data reception or downlink data reception.

11 Claims, 24 Drawing Sheets

(56) References Cited

U.S. PATENT DOCUMENTS

| | | | |
|---|---|---|---|
| 2010/0278131 A1* | 11/2010 | Jeong | H04W 74/0858 370/329 |
| 2012/0077507 A1 | 3/2012 | Lee | |
| 2015/0282213 A1* | 10/2015 | Sun | H04W 74/0833 370/329 |

FOREIGN PATENT DOCUMENTS

| | | |
|---|---|---|
| KR | 10-2010-0026033 | 3/2010 |
| KR | 10-1498089 | 3/2015 |
| WO | 2012150883 | 11/2012 |
| WO | 2015190961 | 12/2015 |

OTHER PUBLICATIONS

MediaTek Inc., "Discussion on Preamble-based RA and Message-based RA for Rel-13 NB-IoT", R1-156990, 3GPP TSG RAN WG1 Meeting #83, Nov. 2015, 4 pages.

European Patent Office Application Serial No. 17753431.0, Search Report dated Sep. 27, 2019, 13 pages.

\* cited by examiner

[FIG. 1]
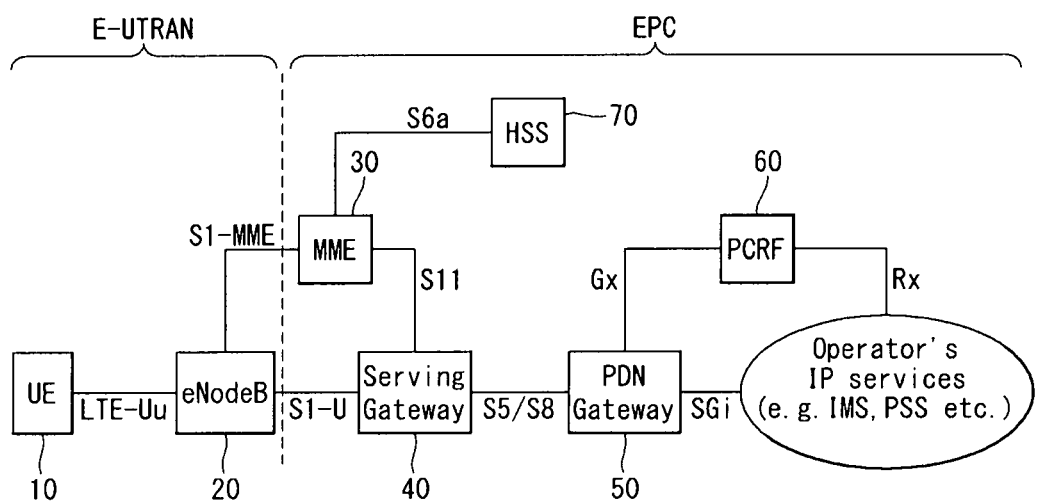

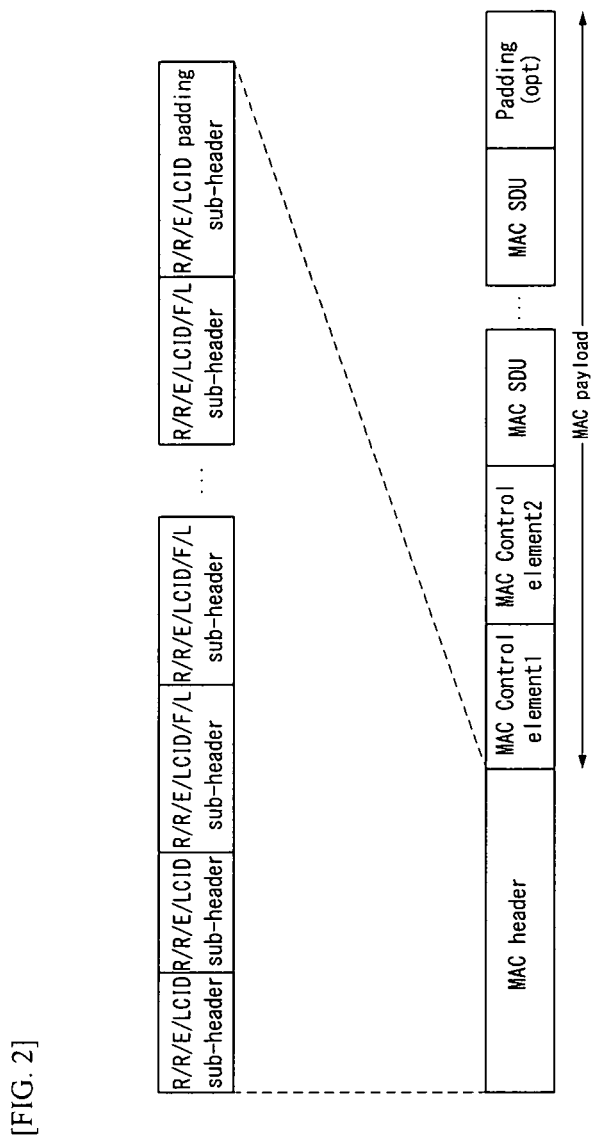
[FIG. 2]

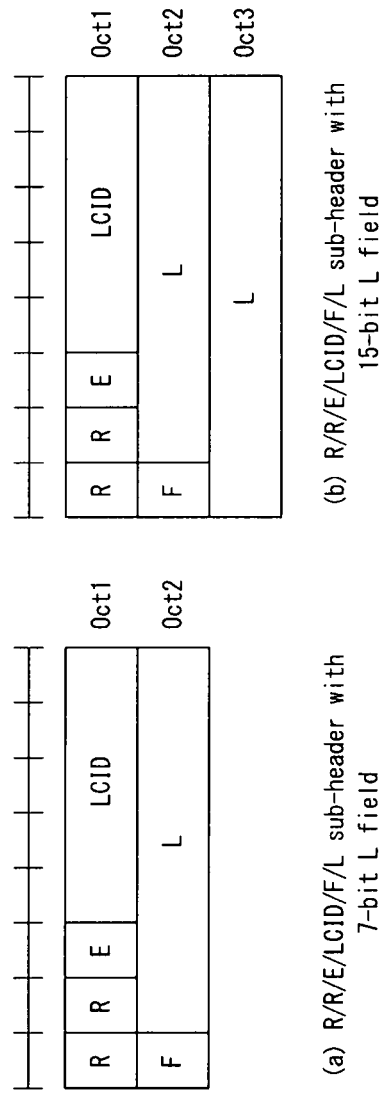
[FIG. 3]

[FIG. 4]
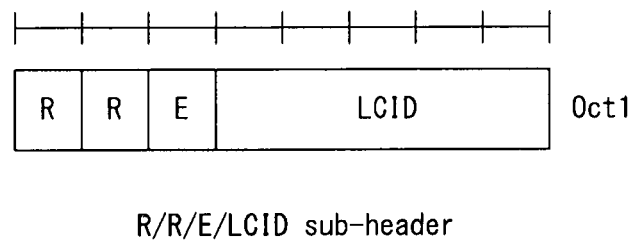
R/R/E/LCID sub-header
[FIG. 5]
(a) 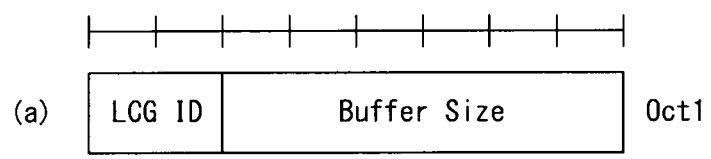
(b) 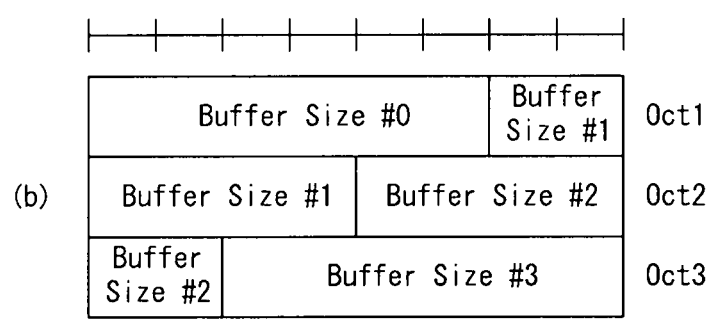

[FIG. 6]
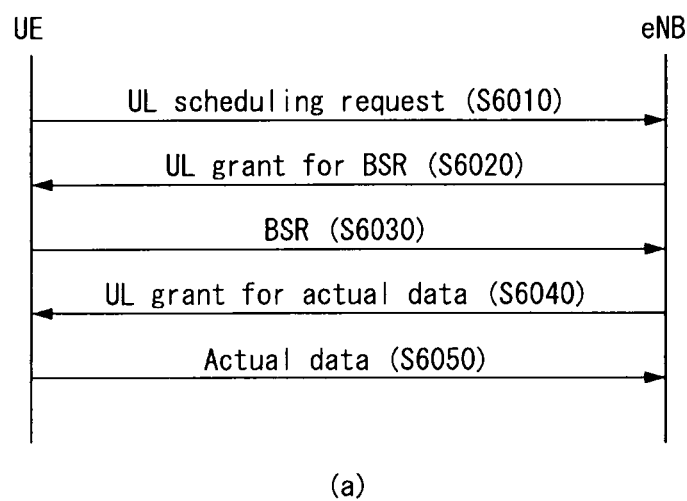
(a)
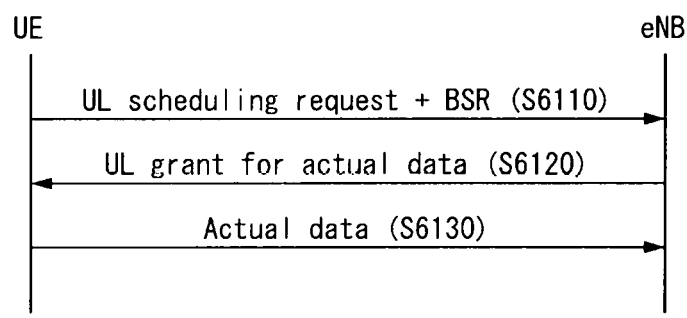
(b)

[FIG. 7]
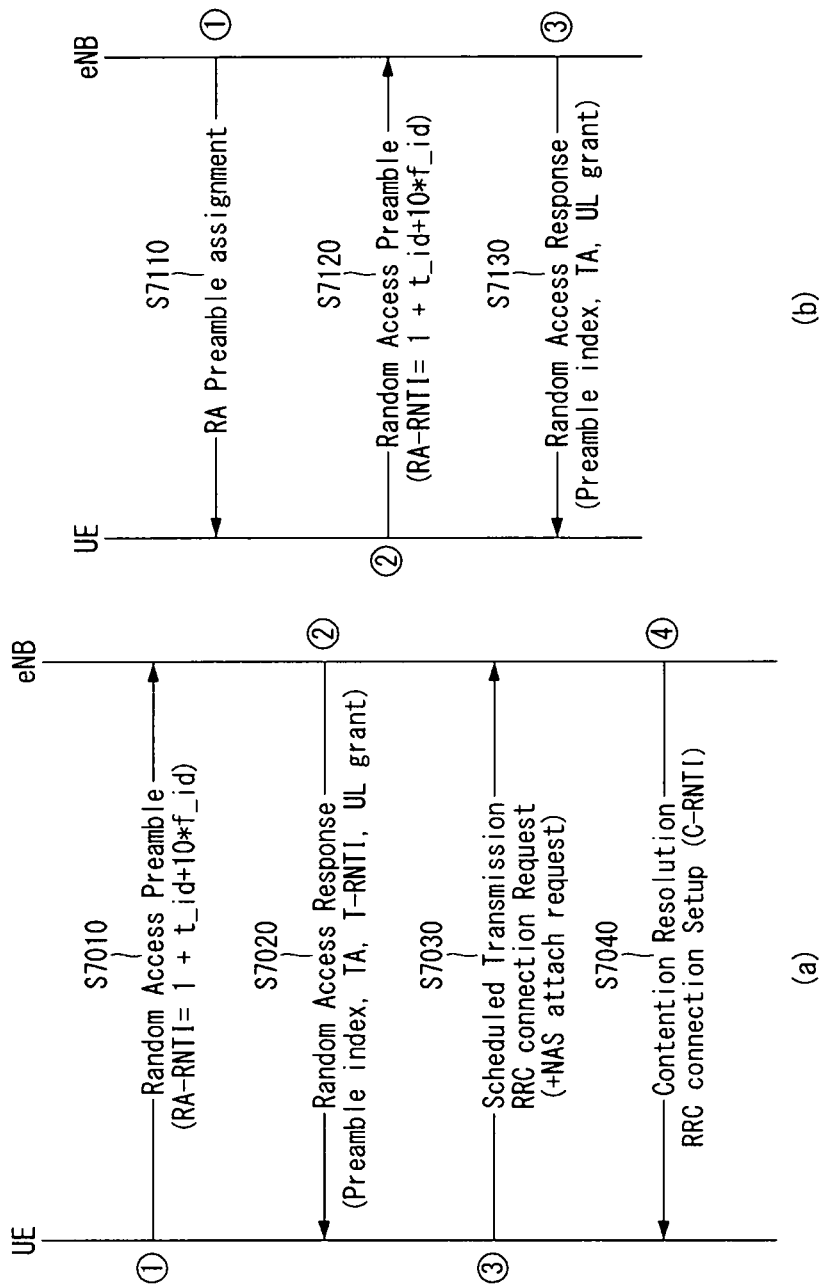

[FIG. 8]
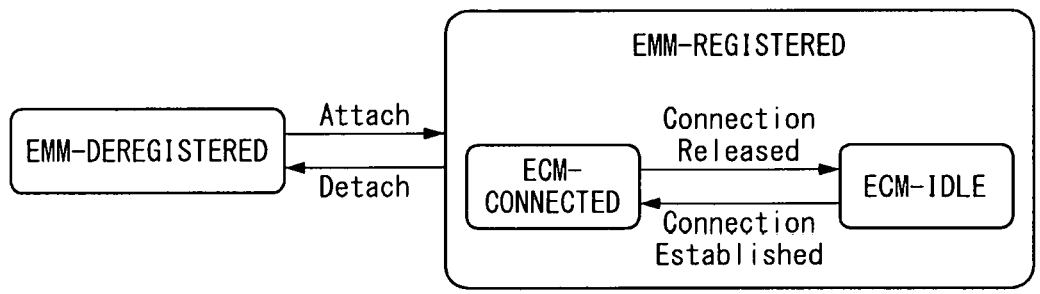
[FIG. 9]
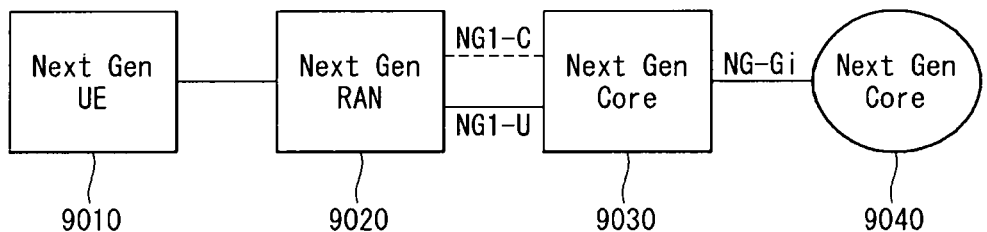

[FIG. 10]
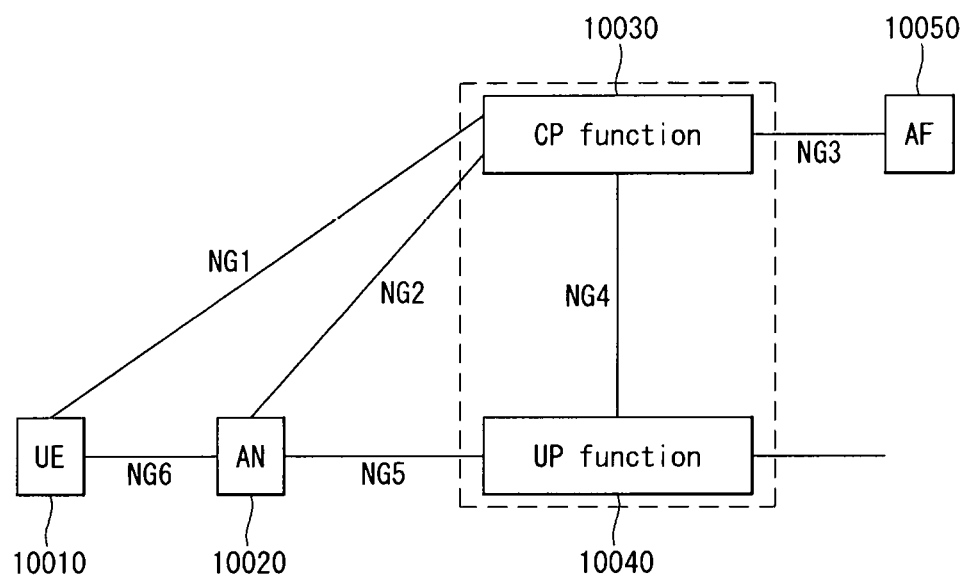
[FIG. 11]
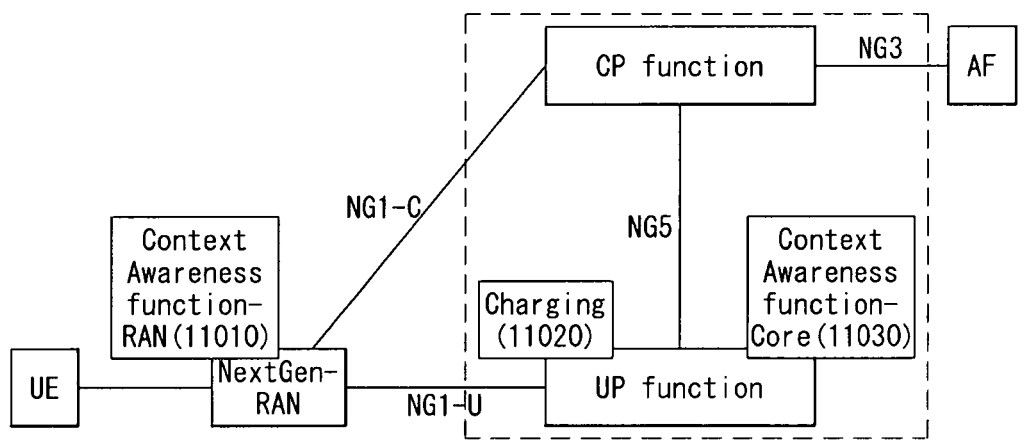

[FIG. 12]
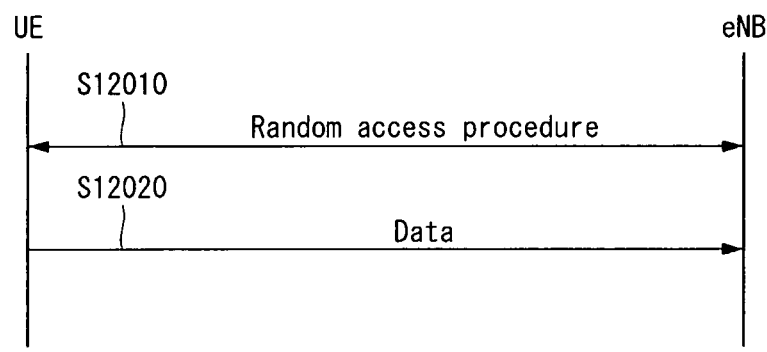
(a)
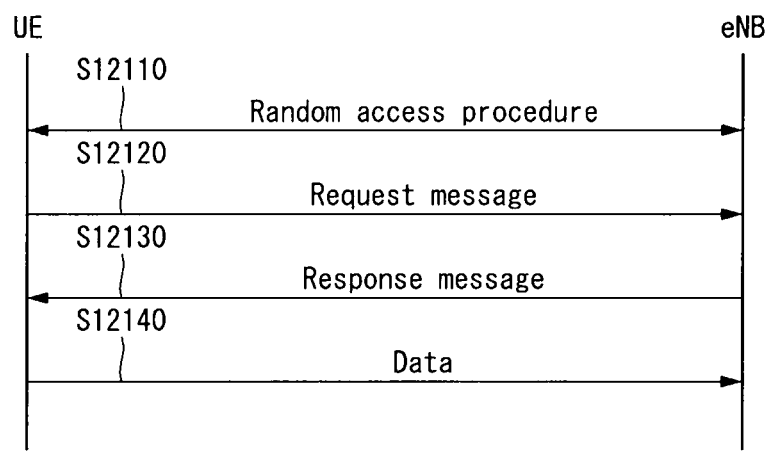
(b)

[FIG. 13]
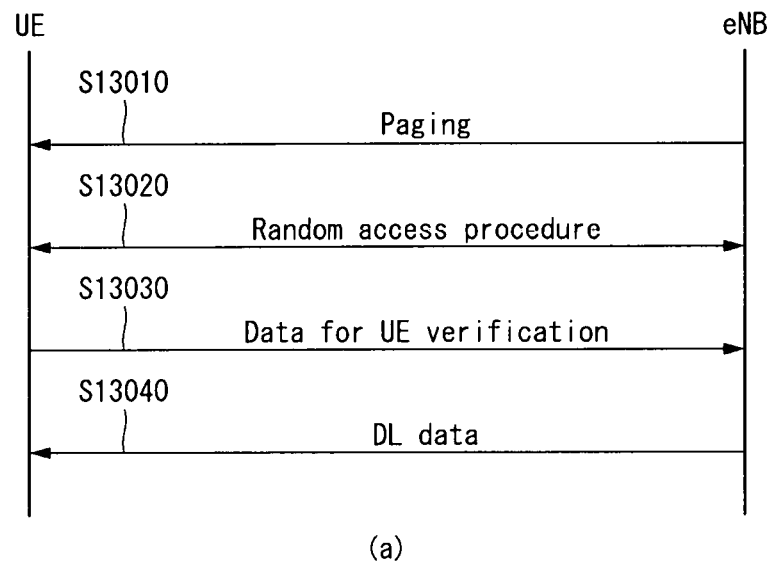
(a)
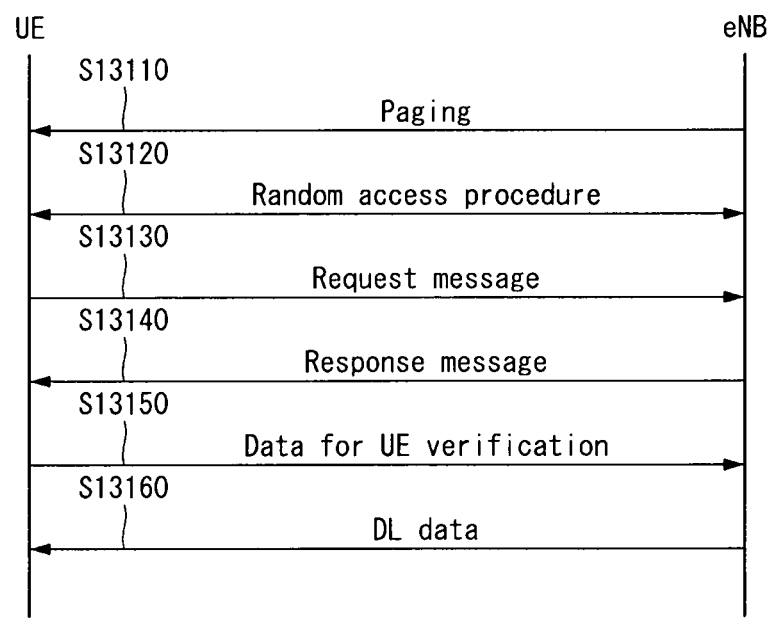
(b)

[FIG. 14]

| Random access resource group | Random access object | UL data size |
|---|---|---|
| A | UL data transmission | Size of UL data ≤ size of information related to UE verification |
| B | UL data transmission | Size of UL data > size of information related to UE verification |
| C | DL data transmission | |

(a) Resource group

| Preamble sequence set | Preamble sequence index |
|---|---|
| A | 0 - 15 |
| B | 16 - 31 |
| C | 32 - 47 |

(b) Sequence classification based on resource group

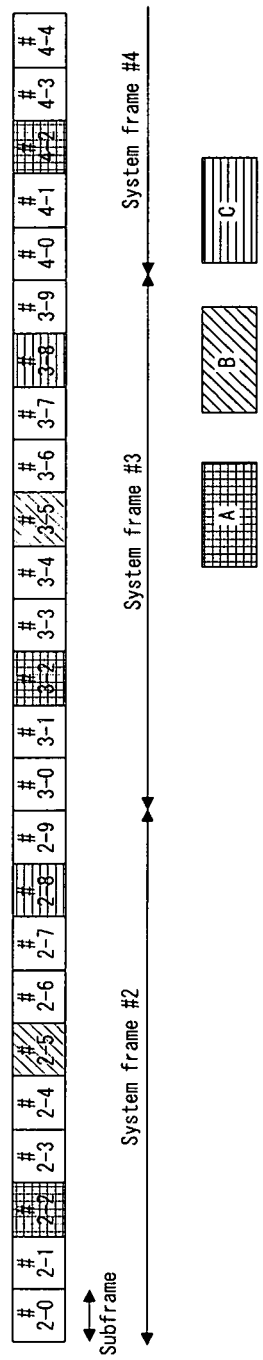
[FIG. 15]

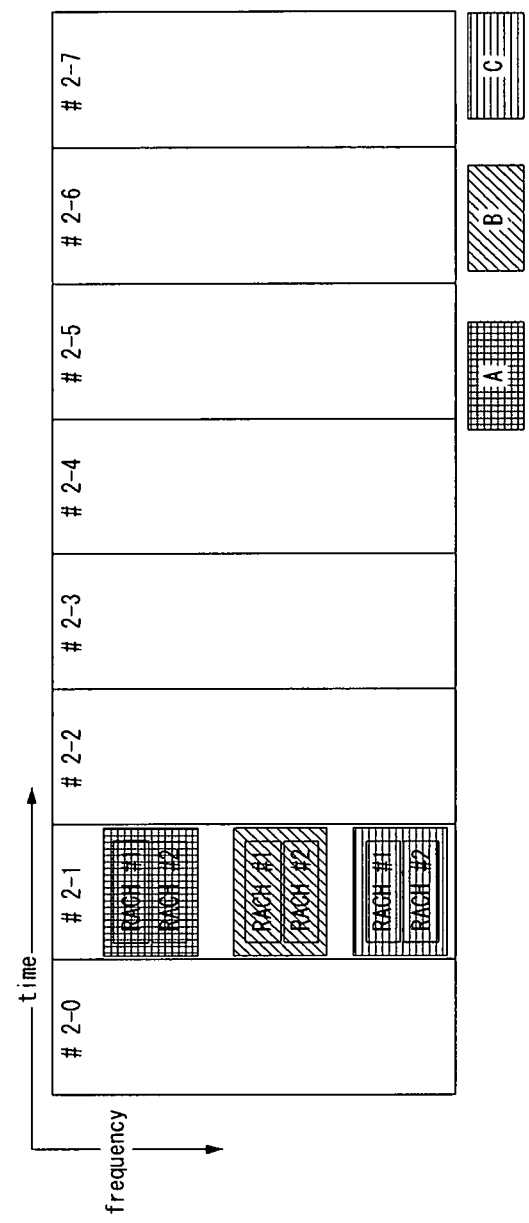
[FIG. 16]

[FIG. 17]
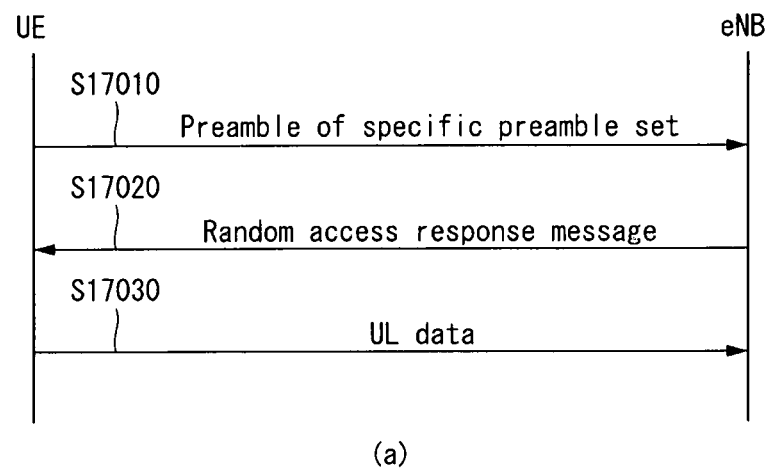
(a)
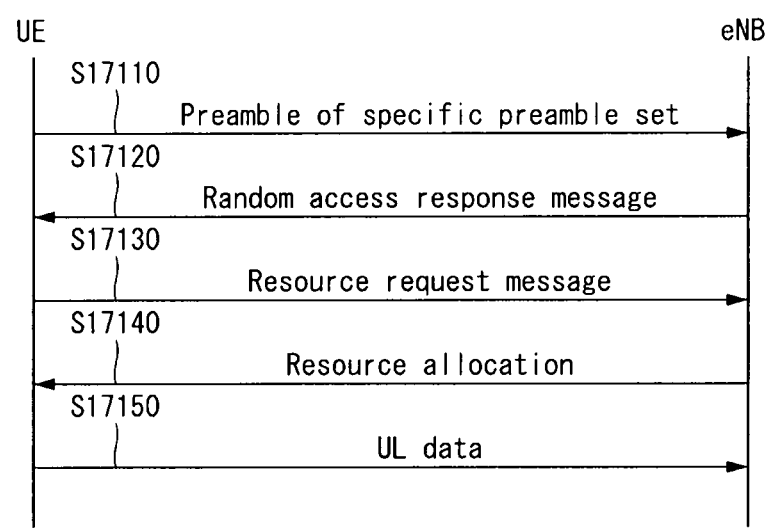
(b)

[FIG. 18]
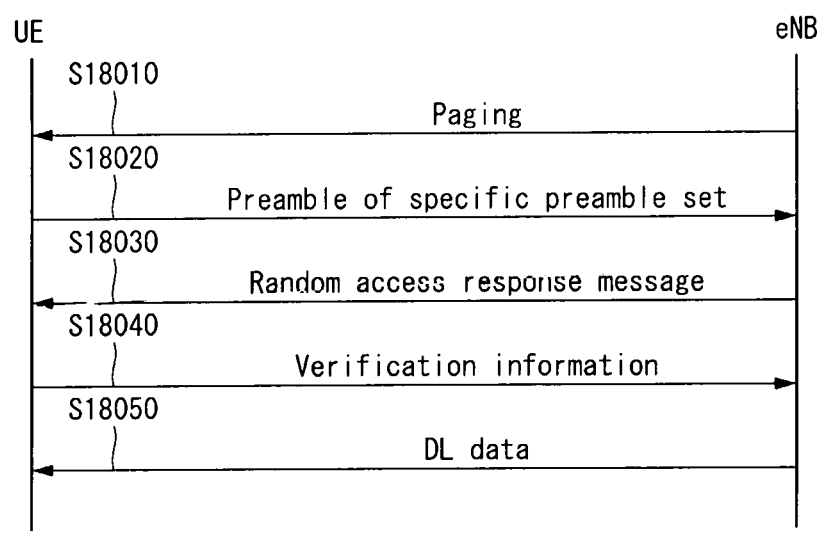

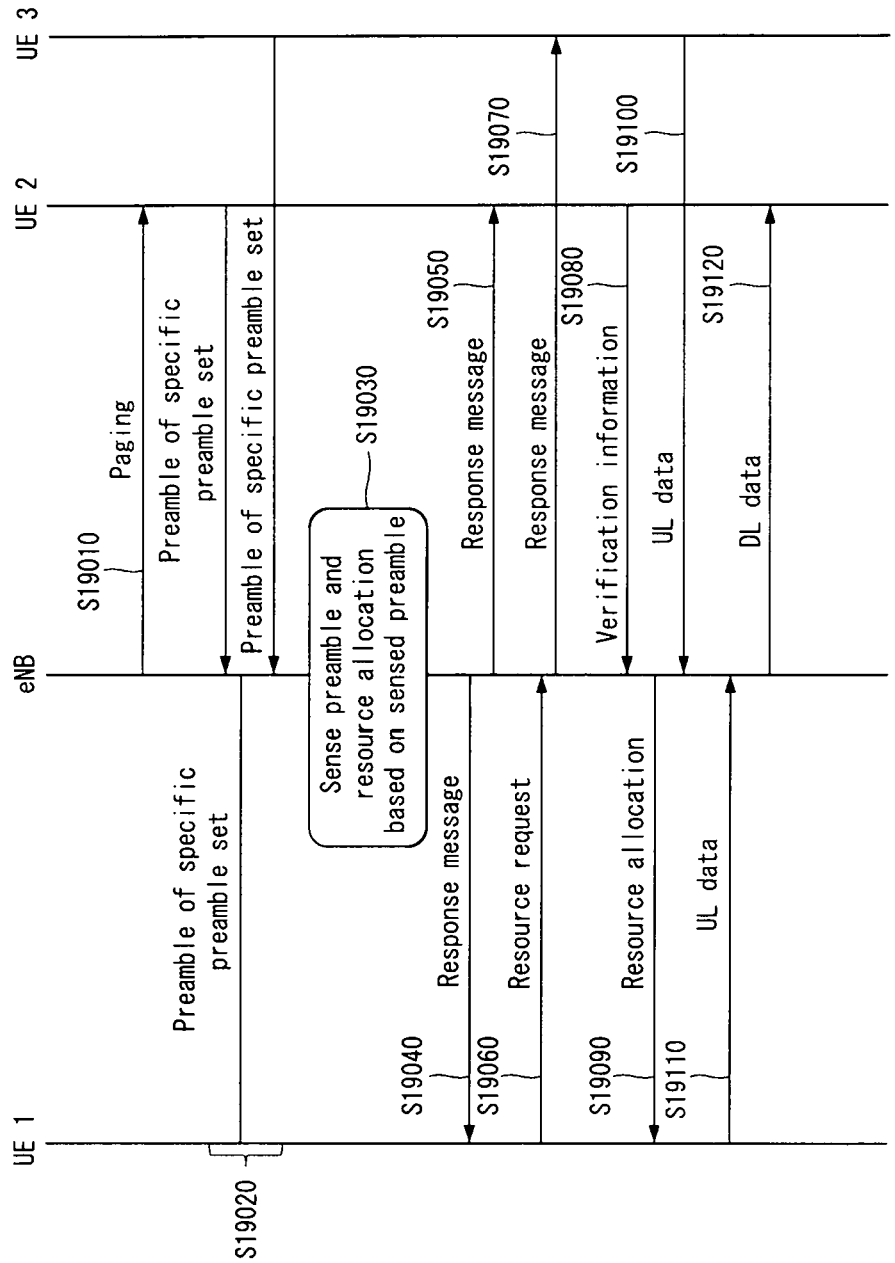
[FIG. 19]

[FIG. 20]
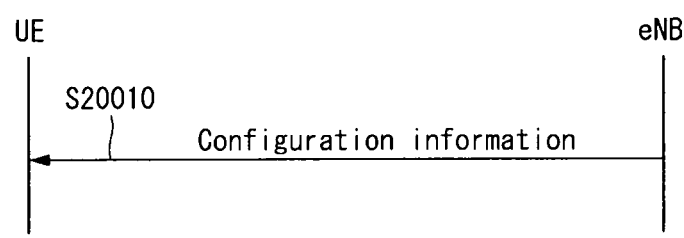

[FIG. 21]
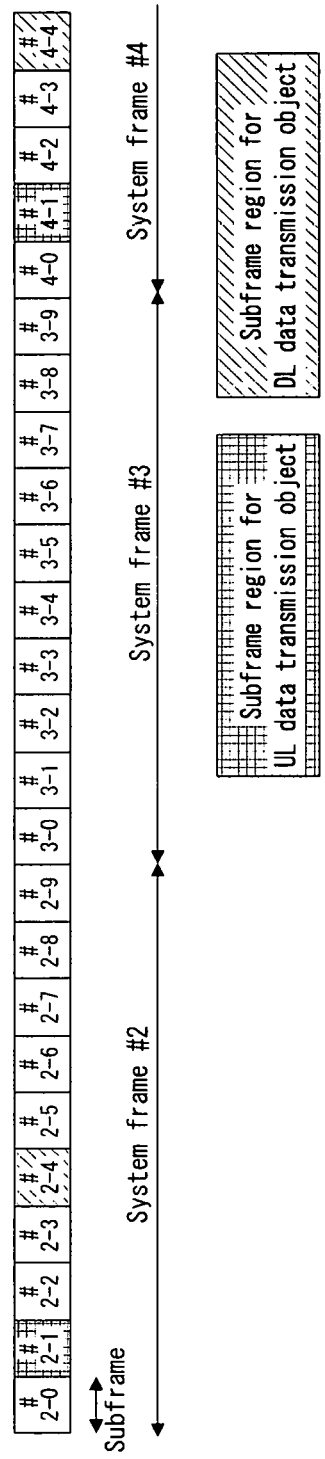

[FIG. 22]
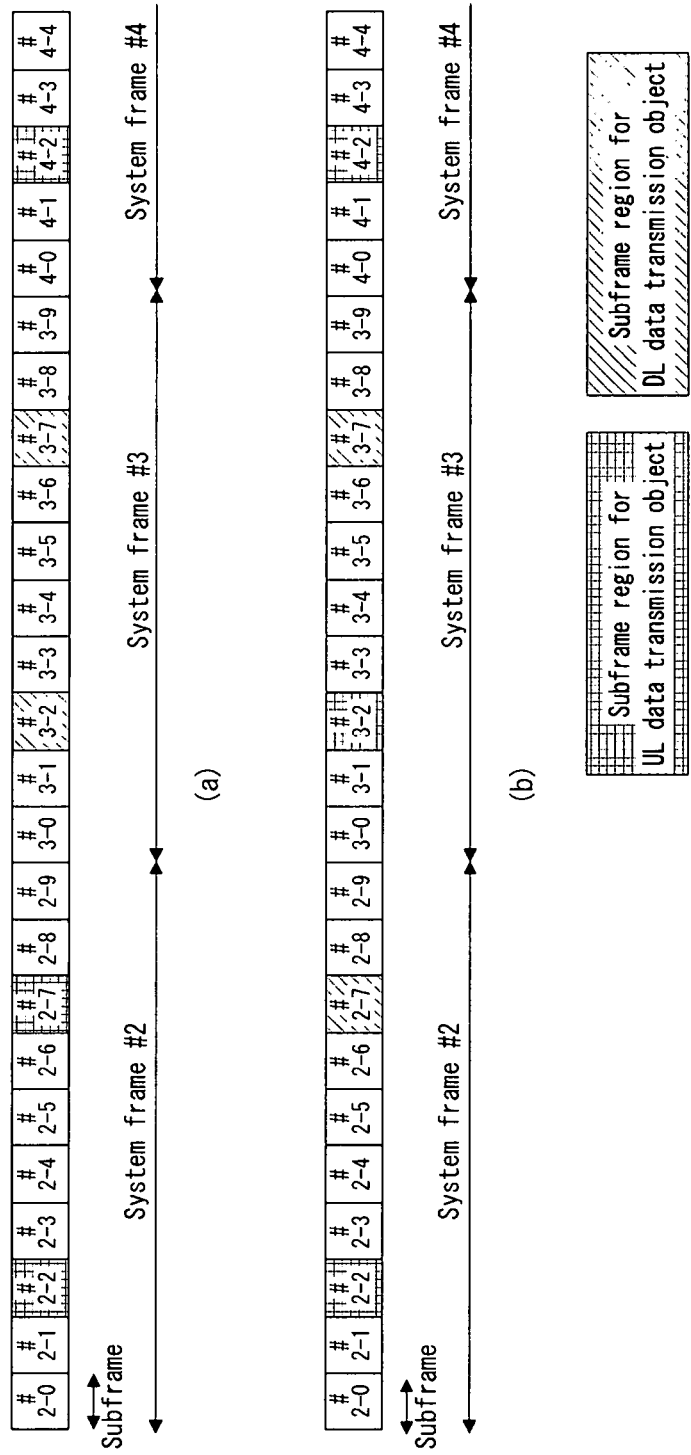

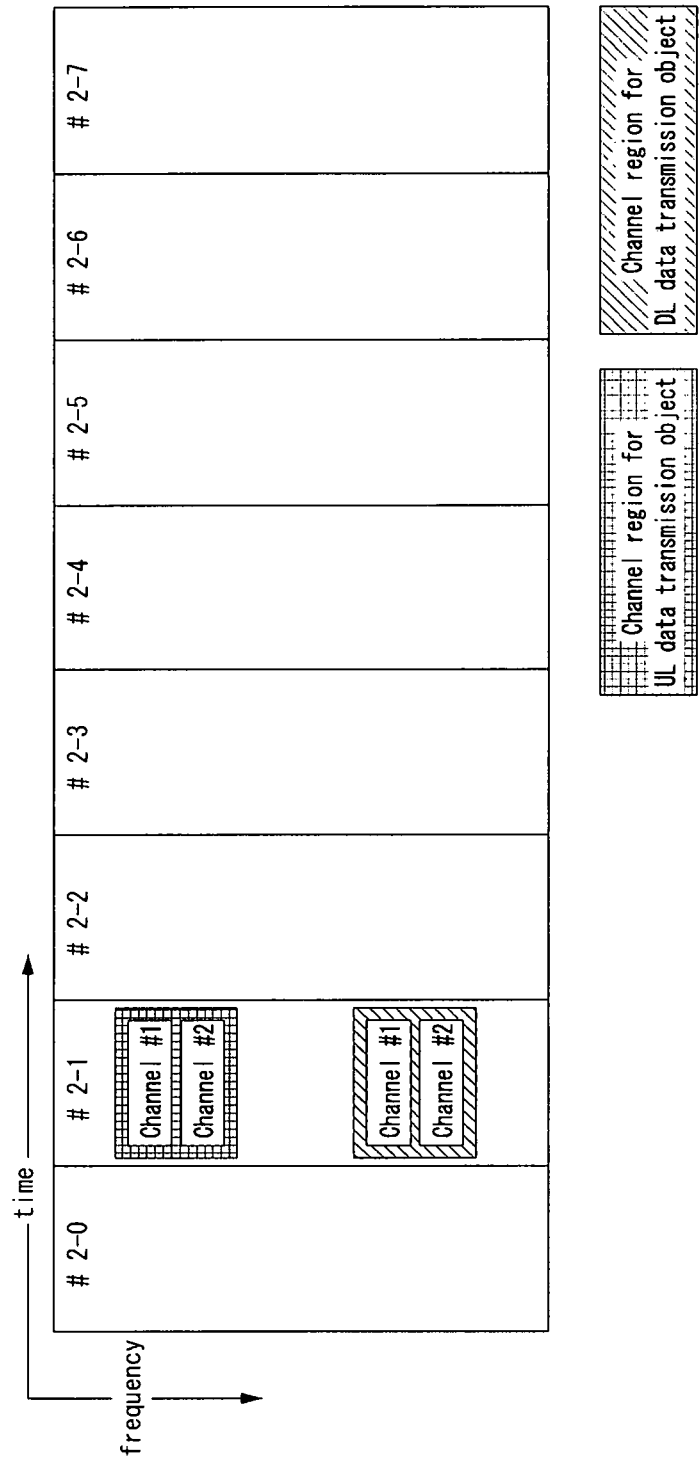
[FIG. 23]

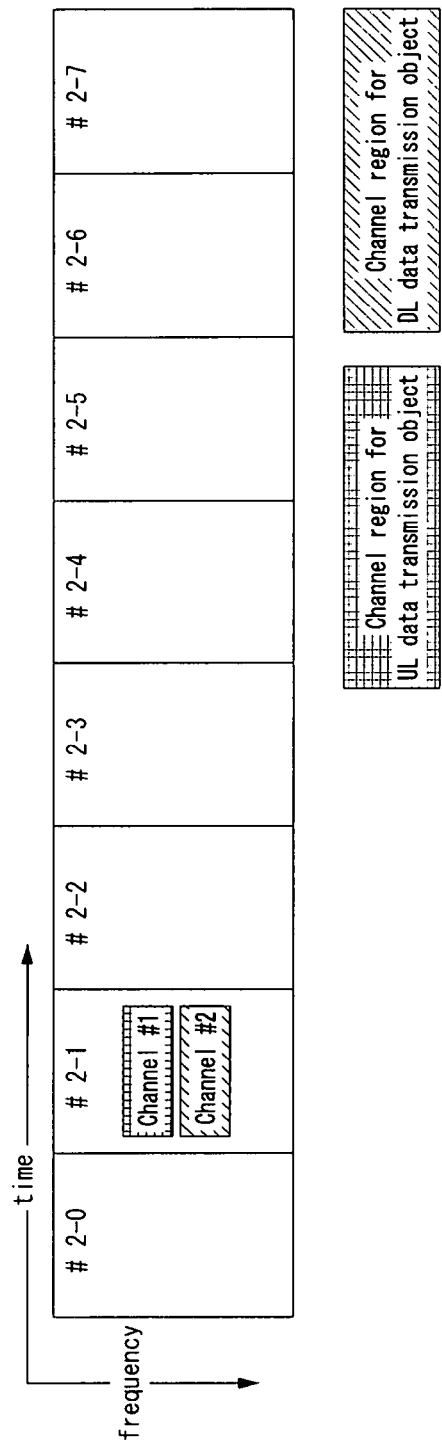
[FIG. 24]

[FIG. 25]
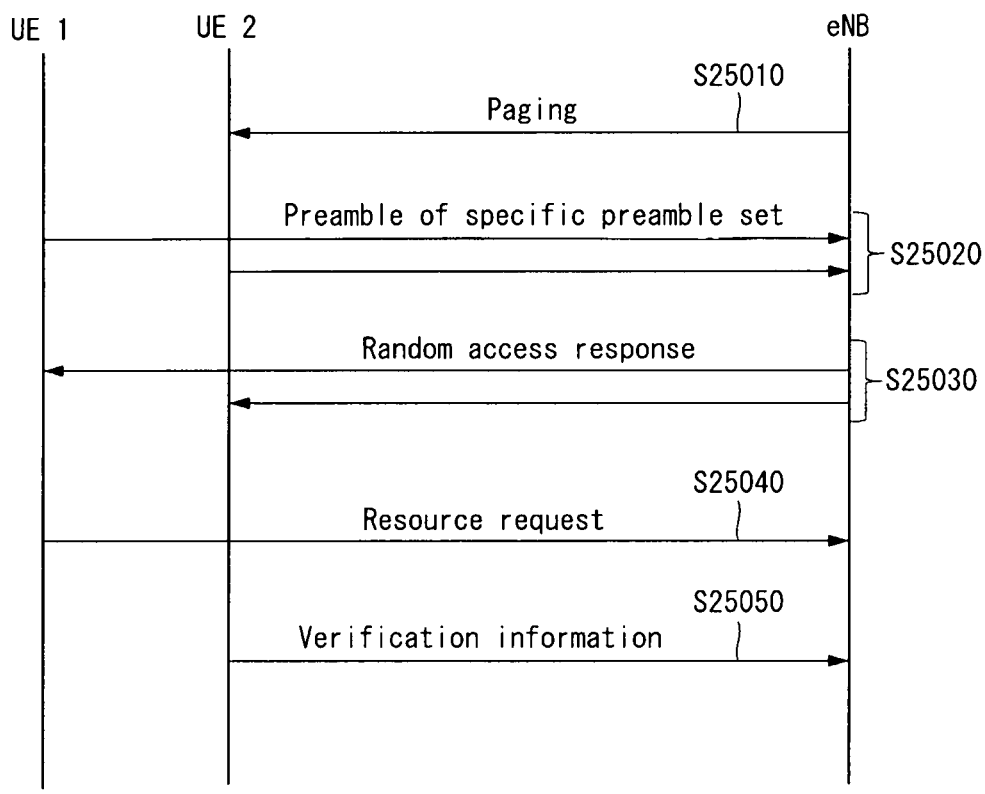

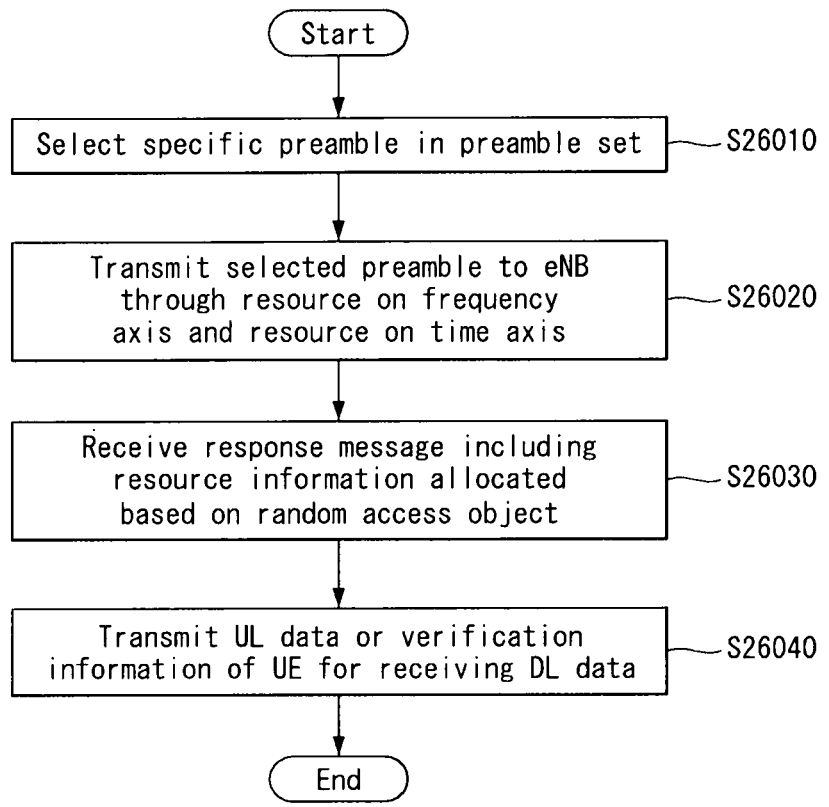
[FIG. 26]

[FIG. 27]
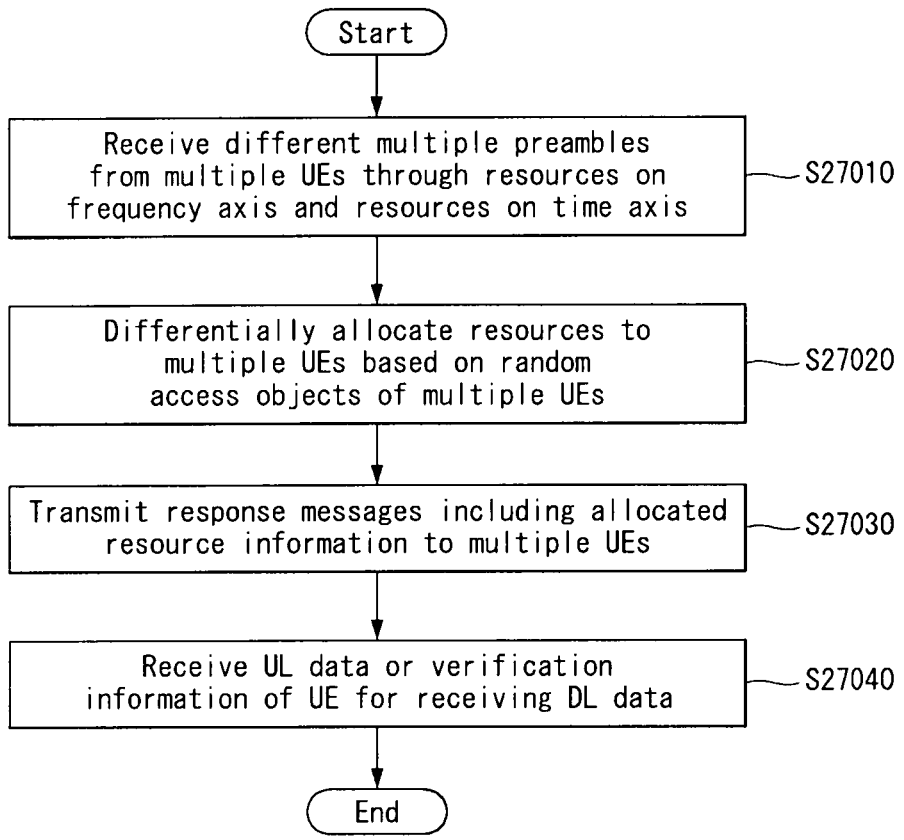
[FIG. 28]
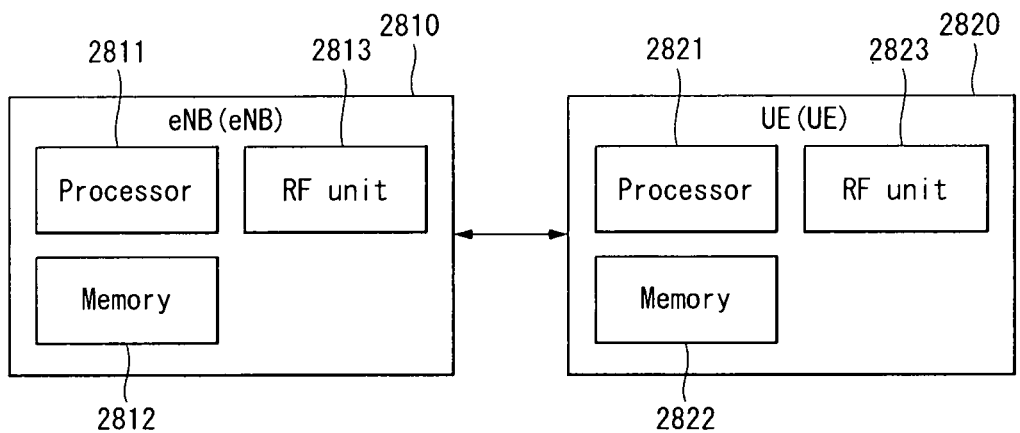

METHOD FOR TRANSMITTING AND RECEIVING DATA IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2017/001543, filed on Feb. 13, 2017, which claims the benefit of U.S. Provisional Application No. 62/297,145, filed on Feb. 19, 2016, 62/306,610, filed on Mar. 10, 2016 and 62/309,952, filed on Mar. 17, 2016, the contents of which are all hereby incorporated by reference herein in their entirety.

TECHNICAL FIELD

The present invention relates to a method for transmitting and receiving data of a user equipment in a wireless communication system and, more particularly, to a method for differentially allocating resources depending on a user equipment without generating a connection between a user equipment and a network node and transmitting and receiving data and an apparatus supporting the same.

BACKGROUND ART

Mobile communication systems have emerged to provide a voice service while guaranteeing mobility of a user. The mobile communication system of today has been expanded to support data services in addition to the voice service. Due to the explosive increase of today's traffic, resources are running short; more and more users are demanding higher speed services; and a more advanced mobile communication system is required accordingly.

Key requirements for a next-generation mobile communication system include accommodation of explosive data traffic, significant increase of transmission rate per user, accommodation of a significantly increased number of connected devices, very low end-to-end latency, and high energy efficiency. In order to meet the requirements, various technologies such as dual connectivity, massive Multiple Input Multiple Output (MIMO), in-band full duplex, Non-Orthogonal Multiple Access (NOMA), super wideband, and device networking are being studied.

DISCLOSURE

Technical Problem

An object of the present invention is to provide a resource scheduling method and apparatus for transmitting and receiving data.

Furthermore, an object of the present invention is to provide a method and apparatus for a network node to differentially schedule resources depending on the purpose of a random access of a user equipment.

Furthermore, an object of the present invention is to provide a method and apparatus for transmitting and receiving data through the resource scheduling of a network node in the state in which a connection between a user equipment and a network node has not been established.

Furthermore, an object of the present invention is to provide a method and apparatus for a network node to schedule resources based on information related to data to be transmitted, which has been transmitted by a user equipment.

Furthermore, an object of the present invention is to provide a method and apparatus for a network node to receive preambles classified based on the direction and size of transmitted and received data from a user equipment and to schedule resources.

Technical objects to be achieved in this specification are not limited to the aforementioned technical objects, and other technical objects not described above may be evidently understood by a person having ordinary skill in the art to which the present invention pertains from the following description.

Technical Solution

In order to accomplish the objects, the present invention provides a method and apparatus for a device to transmit and receive data in a wireless communication system.

Specifically, a method for transmitting and receiving data according to an embodiment of the present invention provides a method including selecting a specific preamble in a preamble set; transmitting the selected specific preamble to an eNB through a resource on a frequency axis and a resource on a time axis, wherein at least one of the preamble set, the resource on the frequency axis or the resource on the time axis is classified based on random access objects of UEs; receiving a response message including resource information indicating an allocated resource based on a first random access object of the first UE from the eNB; and transmitting verification information of the first UE for uplink data or downlink data reception through the allocated resource to the eNB.

Furthermore, in the present invention, the random access object includes at least one of whether the UEs perform random access procedures for transmission of uplink data or reception of downlink data, uplink data to be transmitted by the UEs, or the size of verification information of the UEs.

Furthermore, the present invention further includes receiving configuration information related to the at least one preamble set, the resource on the frequency axis or the resource on the time axis classified based on the random access object from the eNB.

Furthermore, in the present invention, if the preamble set is classified based on the random access object, the configuration information includes number information of a preamble included in the preamble set, index information of a start preamble included in the preamble set or index information indicating the preamble set.

Furthermore, in the present invention, if the resource on the time axis is classified based on the random access object, the configuration information further includes index information indicating the classified resource on the time axis.

Furthermore, in the present invention, if the resource on the time axis is classified based on the random access object, the configuration information further includes index information indicating the classified resource on the frequency axis.

Furthermore, in the present invention, the UE verification information includes at least one of a UE identifier (ID) for identifying the UE, a security header type, a key set identifier for identifying security context, an NAS counter or a message authentication code (MAC).

Furthermore, the present invention provides a method, including receiving multiple different preambles through a resource on a frequency axis and a resource on a time axis from multiple UEs, wherein the multiple different preambles are included in multiple preamble sets, respectively, and at least one of the multiple preamble sets, the resource on the frequency axis or the resource on the time axis is classified based on random access objects of the UEs; allocating resources to the multiple UEs based on the random access objects of the multiple UEs; transmitting response messages including resource information indicating the allocated resources to the multiple UEs; and receiving uplink data or verification information for a verification of the UEs through the allocated resources from the multiple UEs.

Furthermore, the present invention further includes determining the random access objects of the multiple UEs based on the multiple different preambles, resources on the frequency axis in which the multiple different preambles are transmitted or resources on the time axis in which the multiple different preambles are transmitted.

Furthermore, in the present invention, allocating the resources includes determining resource allocation priority based on the random access objects of the multiple UEs and allocating the resources to the multiple UEs based on the determined resource allocation priority.

Furthermore, the present invention further includes transmitting configuration information related to the at least one preamble set, resource on the frequency axis or resource on the time axis classified based on the random access object to the UE.

Furthermore, the present invention provides a UE including a communication unit transmitting and receiving radio signals with respect to an outside and a processor functionally coupled to the communication unit, wherein the processor selects a specific preamble in a preamble set, transmits the selected specific preamble to an eNB through a resource on a frequency axis or a resource on a time axis, wherein at least one of the preamble set, the resource on the frequency axis and the resource on the time axis is classified based on random access objects of UEs, receives a response message including resource information indicating an allocated resource based on a first random access object of the first UE from the eNB, and transmits verification information of the first UE for uplink data or downlink data reception through the allocated resource to the eNB.

Advantageous Effects

The present invention has an effect in that latency of data transmission and reception can be reduced because a UE transmits and receives data without establishing a connection with a network node.

Furthermore, the present invention has an effect in that a network node can allocate a resource corresponding to an amount necessary for a UE to transmit data by differentially scheduling resources based on the purpose of random access of the UE.

Furthermore, the present invention has an effect in that a network node can efficiently allocate resources by allocating the amount of resources necessary to transmit data of a UE.

Furthermore, the present invention has an effect in that data can be transmitted and received even without establishing a connection with a network node because resources allocated by a network node are received by transmitting a preamble for random access and a request message to request random access together.

Furthermore, the present invention has an effect in that a UE can receive resources allocated based on the quality and requirements of data because the UE receives resources allocated by an eNB based on information of data to be transmitted by the UE.

Furthermore, the present invention has an effect in that a network node can differentially allocate resources for each UE based on the size of data, required latency, a transmission object and a transmission direction by scheduling resources based on information transmitted by a UE.

Effects which may be obtained in this specification are not limited to the aforementioned effects, and other technical effects not described above may be evidently understood by a person having ordinary skill in the art to which the present invention pertains from the following description.

DESCRIPTION OF DRAWINGS

FIG. 1 is a diagram showing an example of an evolved packet system (EPS) related to an LTE system to which the present invention may be applied.

FIG. 2 is a diagram illustrating a MAC PDU used in a MAC entity in a wireless communication system to which the present invention may be applied.

FIGS. 3 and 4 illustrate the sub-headers of MAC PDUs in a wireless communication system to which the present invention may be applied.

FIG. 5 is a diagram illustrating the format of a MAC control element for buffer status reporting in a wireless communication system to which the present invention may be applied.

FIG. 6 is a diagram illustrating an uplink resource allocation process for a UE in a wireless communication system to which the present invention may be applied.

FIG. 7 shows an example of a random access procedure in the LTE system.

FIG. 8 is a diagram illustrating the EMM and ECM states in a wireless communication system to which the present invention may be applied.

FIG. 9 is a diagram showing an example of wireless communication system architecture for supporting a next-generation RAN to which methods proposed in this specification may be applied.

FIG. 10 is a diagram showing an example of a flow-based QoS structure to which methods proposed in this specification may be applied.

FIG. 11 is a diagram showing an example of interactions and functions between network functions.

FIG. 12 is a flowchart showing an example of a method of transmitting uplink data in the state in which a UE has not established a connection with a network node, to which the present invention may be applied.

FIG. 13 is a flowchart showing an example of a method for a UE to receive downlink data in the state in which a connection with a network node has not been established, to which the present invention may be applied.

FIGS. 14 to 16 are diagrams showing examples of a method of differentially allocating a resource based on the transmission direction and size of data to which the present invention may be applied.

FIG. 17 is a flowchart showing an example of a method of differentially allocating a resource based on the transmission direction and size of data to which the present invention may be applied.

FIG. 18 is a flowchart showing another example of a method of differentially allocating a resource based on the transmission direction and size of data to which the present invention may be applied.

FIG. 19 is a flowchart showing another example of a method of differentially allocating a resource based on the transmission direction and size of data to which the present invention may be applied.

FIGS. 20 to 24 are diagrams showing examples of a method for transmitting configuration information related to resources classified based on the transmission direction and size of data, to which the present invention may be applied.

FIG. 25 is a flowchart showing an example of a method of receiving resources differentially allocated depending on random access objects of UEs to which the present invention may be applied.

FIG. 26 is a flowchart showing an example of a method for a UE to receive a resource differentially allocated thereto from an eNB based on a random access object of the UE, to which the present invention may be applied.

FIG. 27 is a flowchart showing an example of a method for an eNB to differentially allocate resources to UEs depending on random access objects of UEs to which the present invention may be applied.

FIG. 28 is a diagram showing an example of the internal block diagram of a wireless device to which the present invention may be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the present disclosure, a base station has a meaning of a user equipment node of a network, which directly communicates with a user equipment. In some cases, a specific operation described as being performed by the base station may also be performed by an upper node of the base station. Namely, it is apparent that, in a network including a plurality of network nodes including a base station, various operations performed for communication with a user equipment may be performed by the base station, or network nodes other than the base station. The term 'base station (BS)' may be replaced by the term 'fixed station', 'Node B', 'evolved-NodeB (eNB)', 'base transceiver system (BTS)', 'access point (AP)', network node and the like. The term 'user equipment" may be fixed or mobile, and may be replaced with the term 'user equipment (UE)', 'mobile station (MS)', 'user user equipment (UT)', 'mobile subscriber station (MSS)', 'subscriber station (SS)', 'advanced mobile station (AMS)', 'wireless user equipment (WT)', 'machine-type communication (MTC) device'. 'machine-to-machine (M2M) device', 'device-to-device (D2D) device', and the like.

Hereinafter, the downlink (DL) means communication from a base station to a user equipment, and the uplink (UL) means communication from a user equipment to a base station. In the downlink, a transmitter may be part of a base station, and a receiver may be part of a user equipment.

In the uplink, a transmitter may be part of a user equipment, and the receiver may be part of a base station.

Specific terms described in the following description are provided to help understanding of the present invention, and the use of such specific terms may be changed in other forms without departing the technical spirit of the present invention.

The following technology may be used for various radio access systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and adopts OFDMA in the downlink and adopts SC-FDMA in the uplink. LTE-advanced (A) is the evolution of 3GPP LTE.

Embodiments of the present invention may be supported by at least one standard document which is described in IEEE 802, 3GPP and 3GPP2, which are wireless access systems. That is, among the embodiments of the present invention, steps or parts that are not described for disclosing the technical concept of the present invention apparently may be supported by the documents. In addition, all terms disclosed in this document may be described by the standard document.

For clear description, the present invention is described mainly for 3GPP LTE/LTE-A, but the technical features of the present invention are not limited thereto, but may also be applied to 5G system.

Before describing with reference to drawings, for understanding the present invention, the terms used in the present disclosure are briefly defined.

EPS: This is an abbreviation of Evolved Packet System, and means a core network that supports Long Term Evolution (LTE) network. This is a network in the form evolved from UMTS.

PDN (Public Data Network): An independent network at which a server that provides a service is located.

APN (Access Point Name): This is a name of an access point managed in a network, and provided to a UE. That is, this indicates a name (a character string) of the PDN. Based on the name of an access point, the corresponding PDN for transmitting and receiving data is determined.

TEID (Tunnel Endpoint Identifier): This is an End point ID of a tunnel configured between nodes in a network, and configured in each section as a unit of bearer of each UE.

MME: This is an abbreviation of Mobility Management Entity, and plays the role of controlling each entity in the EPS in order to provide a session and mobility for a UE.

Session: A session is a passage for transmitting data, and the unit may be a unit of PDN, Bearer, IP flow, and so on.

A difference of each unit may be distinguished by a target network entire unit (a unit of APN or PDN), a unit distinguished by QoS therein (a unit of Bearer) and a unit of destination IP address as defined in 3GPP.

EPS Bearer: A logical path generated between a UE and a gateway through which various types of traffics are transmitted and received.

Default EPS Bear: This is a logical path for transmitting and receiving data which is generated basically when a UE accesses to a network, and may be maintained until the UE is detached from the network.

Dedicated EPS Bearer: A logical path generated for being provided with a service additionally after the Default EPS Bear is generated, if it is required.

IP flow: Various types of traffics transmitted and received through a logical path between a UE and a gateway.

Service Data Flow (SDF): IP flow of a user traffic or combination of a plurality of IP flows which is classified according to a service type.

PDN connection: This represents an association (connection) between a UE represented by an IP address and the PDN represented by the APN. This means a connection (UE-PDN GW) between entities in a core network so as to form a session.

UE Context: State information of a UE used for managing the UE in a network, that is, state information including UE ID, mobility (current location, etc.), an attribute of a session (QoS, priority, etc.)

TIN: Temporary Identity used in Next update
P-TMSI: Packet Temporary Mobile Subscriber
TAU: Tracking Area Update
GBR: Guaranteed Bit Rate
GTP: GPRS Tunneling Protocol
TEID: Tunnel Endpoint ID
GUTI: Globally Unique Temporary Identity, UE identity known to an MME FIG. 1 is a view illustrating an Evolved Packet System which is associated with the Long Term Evolution (LTE) system to which the present invention can be applied.

The LTE system aims to provide seamless Internet Protocol (IP) connectivity between a user equipment (UE) 10 and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station 20, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

In the present invention, the MME 30 corresponds to an entity in which a function necessary to process authentication of the UE and context information is implemented, where the MME 30 is described as one embodiment of the entity. Therefore, other devices in addition to the MME 30 can also carry out the corresponding function.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

In the present invention, the S-GW 40 corresponds to an entity in which a function necessary for processing authentication of the UE and context information is implemented, where the S-GW 40 is described as one embodiment of the entity. Therefore, other devices in addition to the S-GW 40 can also carry out the corresponding function.

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

In the present invention, the P-GW 50 corresponds to an entity in which a function necessary for processing routing/forwarding of user data is implemented, where the P-GW 50 is described as one embodiment of the entity. Therefore, other devices in addition to the P-GW 50 can also carry out the corresponding function.

The PCRF 60 performs policy control decision-making and performs flow-based charging.

The HSS 70 is also called a home location register (HLR), and includes an EPS-subscribed QoS profile and SAE subscription data including access control information for roaming. Furthermore, the HSS also includes information about a PDN accessed by a user. Such information may be maintained in an access point name (APN) form. The APN is a domain name system (DNS)-based label, and is an identity scheme that describes an access point for a PDN or a PDN address indicative of a subscribed IP address.

As shown in FIG. 1, various interfaces, such as S1-U, S1-MME, S5/S8, S11, S6a, Gx, Rx and SG, may be defined between EPS network elements.

Hereinafter, the concept of mobility management (MM) and an MM back-off timer are described in detail. The mobility management (MM) is a procedure for reducing overhead on the E-UTRAN and processing in a UE.

If the mobility management (MM) is applied, all of pieces of information related to a UE in an access network may be released during the cycle in which data is deactivated. The MME may maintain UE context and information related to a configured bearer during an Idle interval.

A UE may notify a network of a new location whenever it deviates from a current tracking area (TA) so that the network may contact the UE in the ECM-IDLE state. Such a procedure may be called "Tracking Area Update." This procedure may be called "Routing Area Update" in a universal terrestrial radio access network (UTRAN) or GSM EDGE radio access network (GERAN) system. The MME performs a function for tracking a user location while a UE is in the ECM-IDLE state.

If downlink data to be delivered to a UE in the ECM-IDLE state is present, the MME transmits a paging message to all of eNodeB on a tracking area (TA) with which the UE has been registered.

Next, the base station starts paging for the UE on a radio interface. When the paging message is received, the base station performs a procedure that enables the state of the UE to switch to the ECM-CONNECTED state. Such a procedure may be called a "Service Request Procedure." Accordingly, information related to the UE is generated in the E-UTRAN, and all of bearers are re-established. The MME performs the re-establishment of the radio bearers and a function of updating UE context on the base station.

If the mobility management (MM) procedure is performed, a mobility management (MM) backoff timer may be additionally used. Specifically, the UE may transmit tracking area update (TAU) in order to update the TA. The MME may reject a TAU request due to core network congestion. In this case, the MME may provide a time value related to the MM backoff timer. When the corresponding time value is received, the UE may activate the MM backoff timer.

FIG. 2 is a diagram illustrating a MAC PDU used in a MAC entity in a wireless communication system to which the present invention may be applied.

Referring to FIG. 2, the MAC PDU includes a MAC header, at least one MAC service data unit (SDU) and at least one MAC control element and may further include padding. According to circumstances, at least one of the MAC SDU and the MAC control element may not be included in the MAC PDU.

As shown in FIG. 2, the MAC control element is commonly located prior to the MAC SDU. Furthermore, the size of the MAC control element may be fixed or variable. If the size of the MAC control element is variable, whether the size of the MAC control element has been expanded may be determined through an extended bit. The size of the MAC SDU may also be variable.

The MAC header may include at least one sub-header. In this case, the one or more sub-headers included in the MAC header correspond to a MAC SDU, a MAC control element and padding, respectively. The sequence of the sub-headers is the same as the deployment sequence of corresponding elements. For example, if a MAC control element 1, a MAC control element 2, a plurality of MAC SDUs and padding are included in the MAC PDU, a sub-header corresponding to the MAC control element 1, a sub-header corresponding to the MAC control element 2, a plurality of sub-headers respectively corresponding to the plurality of MAC SDUs, and a sub-header corresponding to the padding may be sequentially deployed in the MAC header.

The sub-header included in the MAC header may include 6 header fields. Specifically, the sub-header may include the 6 header fields of R/R/E/LCID/F/L.

A sub-header including 4 header fields may be used with respect to a sub-header corresponding to a MAC control element of a fixed size and a sub-header corresponding to the last one of data fields included in the MAC PDU. If a sub-header includes the 4 fields as described above, the 4 fields may be R/R/E/LCID.

FIGS. 3 and 4 illustrate the sub-headers of MAC PDUs in a wireless communication system to which the present invention may be applied.

Each field is described below with reference to FIGS. 3 and 4.

1) R: it is a reserved bit and is a not-used bit.

2) E: it is an extended field and indicates whether an element corresponding to a sub-header has been extended. For example, if the E field is "0", a sub-header corresponding to an element is terminated without a repetition. If the E field is "1", an element corresponding to a sub-header is repeated once m ore and a length thereof may be extended to 2.

3) LCID: a logical channel identification field identifies a logical channel corresponding to a corresponding MAC SDU or identifies the type of corresponding MAC control element and padding. If a thing associated with a sub-header is a MAC SDU, the LCID indicates that the MAC SDU is a MAC SDU corresponding to which logical channel. If a thing associated with a sub-header is a MAC control element, the LCID indicates that the MAC control element is which MAC control element.

Table 1 shows an example of LCID values for a DL-SCH.

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 2 shows values of LCIDs for an UL-SCH.

TABLE 2

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In the LTE/LTE-A system, a UE may configure any one index value of a truncated BSR, a short BSR and a long BSR in the LCID field, and may report its own buffer status to a network.

Mapping relations between the indices and the LCID values illustrated in Table 1 and Table 2 have been illustrated for convenience of description, and the present invention is not limited thereto.

4) F: it is a format field and indicates the size of an L field.

5) L: it is length field and indicates the size of an MAC SDU and MAC control element corresponding to sub-headers. If the size of the MAC SDU or MAC control element corresponding to sub-headers is equal to or smaller than 127 bits, an L field of 7 bits is used (FIG. 3(*a*)). In other cases, an L field of 15 bits may be used (FIG. 3(*b*)). If a MAC control element has a variable size, the size of the MAC control element may be defined through an L field. If the size of a MAC control element is fixed, F and an L field may be omitted as in FIG. 4 because the size of the MAC control element can be determined although the size of the MAC control element is not defined by the L field.

FIG. 5 is a diagram illustrating the format of a MAC control element for buffer status reporting in a wireless communication system to which the present invention may be applied.

If a truncated BSR and a short BSR are defined in the LCID field of a sub-header, a MAC control element corresponding to the sub-header may be configured to include one logical channel group identification (LCG ID) field and one buffer size field indicative of the buffer status of a logical channel group as in the example of FIG. 5(*a*). The LCG ID field is for identifying a logical channel group whose buffer status needs to be reported, and the LCG ID field may have a size of 2 bits.

The buffer size field is for identifying a total amount of available data of all of logical channels belonging to a logical channel group after a MAC PDU is generated. The available data includes all data that may be transmitted in the RLC layer and PDCP layer, and the amount of data is indicated by the number of bytes. In this case, when the amount of data is computed, the size of an RLC header and a MAC header may be excluded. The buffer size field may have a size of 6 bits.

If a long BSR is defined in the LCID field of a sub-header, a MAC control element corresponding to a sub-header may include 4 buffer size fields indicative of the buffer status of 4 groups having 0 to 3 LCG IDs as in the example of FIG. 5(*b*). Each buffer size field may be used to identify a total amount of data available for each different logical channel group.

However, there is a problem in that a UE that has not configured a logical path (e.g., DRB, SRB1/2) because a RRC connection has not been established between the UE and an eNB does not have an LGC ID.

Accordingly, the present invention proposes a method for a UE to receive an uplink resource allocated thereto from an eNB depending on the size and characteristic of the uplink data in the state in which a RRC connection has not been established between the UE and the eNB as described above, and to transmit the uplink data.

Uplink Resource Allocation Procedure

In the case of the 3GPP LTE/LTE-A system, a data transmission and reception method based on the scheduling of an eNB is used in order to maximize the utilization of resources. This means that a UE first requests uplink resource allocation from an eNB if it has data to be transmitted and transmits the data using only an uplink resource allocated by the eNB.

FIG. 6 is a diagram illustrating an uplink resource allocation process for a UE in a wireless communication system to which the present invention may be applied.

For efficient use of an uplink radio resource, an eNB needs to be aware how much each UE will transmit data of which type in the uplink. Accordingly, the UE may directly deliver information about uplink data to be transmitted to the eNB, and the eNB may allocate uplink resources to the corresponding UE based on the information. In this case, the information about uplink data delivered from the UE to the eNB is the amount of uplink data stored in its own buffer, which is called buffer status reporting (BSR). The BSR is transmitted using a MAC control element if a resource on a PUSCH is allocated to a UE in a current TTI and a reporting event is triggered.

FIG. 6(*a*) illustrates an uplink resource allocation process for actual data if an uplink radio resource for buffer status reporting (BSR) has not been allocated to a UE. That is, a UE that switches from a DRX mode to the state of an active mode needs to request a resource for uplink data based on the start of SR transmission through a PUCCH because it does not have a previously allocated data resource. In this case, a 5-step uplink resource allocation procedure is used.

FIG. 6(*a*) is a case where a PUSCH resource for transmitting BSR has not been allocated to a UE. The UE first transmits a scheduling request (SR) to an eNB in order to receive a PUSCH resource allocated thereto (S6010).

The scheduling request is used for a UE to request the allocation of a PUSCH resource for uplink transmission from an eNB if a reporting event has occurred, but a radio resource has not been scheduled on a PUSCH in a current TTI with respect to the UE.

That is, the UE transmits the SR on a PUCCH if regular buffer status reporting (BSR) has been triggered, but the UE does not have an uplink radio resource for transmitting the BSR to the eNB. The UE transmits the SR through the PUCCH or initiates a random access procedure depending on whether a PUCCH resource for the SR has been configured. Specifically, the PUCCH resource in which the SR may be transmitted is configured by a higher layer (e.g., RRC layer) in a UE-specific way, and the SR configuration includes SR periodicity and SR subframe offset information.

When the UE receives an UL grant for the PUSCH resource for BSR transmission from the eNB (S6020), the UE transmits the triggered BSR to the eNB through the PUSCH resource allocated by the UL grant (S6030).

The eNB checks the amount of data that will be actually transmitted by the UE in the uplink through the BSR, and transmits the UL grant for the PUSCH resource for actual data transmission to the UE (S6040). The UE that has received the UL grant for actual data transmission transmits actual uplink data to the eNB through the allocated PUSCH resource (S6050).

FIG. 6(*b*) illustrates an uplink resource allocation process for actual data if an uplink radio resource for BSR has been allocated to a UE.

FIG. 6(*b*) is a case where a PUSCH resource for BSR transmission has already been allocated to a UE. The UE transmits the BSR through the allocated PUSCH resource and transmits a scheduling request to an eNB along with the BSR (S6110). Next, the eNB checks the amount of data to be actually transmitted by the UE in the uplink through the BSR, and transmits an UL grant for the PUSCH resource for actual data transmission to the UE (S6120). The UE that has received the UL grant for actual data transmission transmits the actual uplink data to the eNB through the allocated PUSCH resource (S6130).

Random Access Procedure (RACH Procedure)

FIG. 7 shows an example of a random access procedure in the LTE system.

A random access procedure is performed when initial access in RRC_IDLE, initial access after a radio link failure, handover that requires a random access procedure, or uplink or downlink data that requires a random access procedure during RRC_CONNECTED occurs. Some RRC messages, such as an RRC connection request message, a cell update message, and a UTRAN registration area (URA) update message, are transmitted using a random access procedure. A logical channel common control channel (CCC), a dedicated control channel (DDCH), and a dedicated traffic channel (DTCH) may be mapped to a transport channel RACH. The transport channel RACH is mapped to a physical random access channel (PRACH).

When the MAC layer of the UE indicates PRACH transmission in a UE physical layer, the UE physical layer first selects one access slot and one signature and transmits a PRACH preamble in the uplink. A random access procedure is divided into a contention-based random access procedure and a non-contention-based random access procedure.

FIG. 7(a) shows an example of a contention-based random access procedure, and FIG. 7(b) shows an example of a non-contention-based random access procedure.

First, the contention-based random access procedure is described with reference to FIG. 7(a).

A UE receives information about random access from an eNB through system information and stores the information. Thereafter, if random access is necessary, the UE transmits a random access preamble (also called a message 1) to the eNB (S7010).

When the eNB receives the random access preamble from the UE, the eNB transmits a random access response message (also called a message 2) to the UE (S7020). Specifically, downlink scheduling information about the random access response message is CRC-masked with a random access (RA)-radio network temporary identifier (RNTI) and may be transmitted on an L1 or L2 control channel (PDCCH). The UE that has received a downlink scheduling signal masked with the RA-RNTI may receive the random access response message from a physical downlink shared channel (PDSCH) and decode the random access response message. Thereafter, the UE confirms whether random access response information indicated therefor is present in the random access response message.

Whether random access response information indicated thereto is present may be checked based on whether a random access preamble ID (RAID) for a preamble transmitted by a UE is present or not.

The random access response information includes timing alignment (TA) indicative of timing offset information for synchronization, radio resource allocation information used in the uplink, a temporary identifier (e.g., a temporary C-RNTI) for UE identification, and so on.

When the UE receives the random access response information, the UE performs uplink transmission (also expressed as a message 3) through an uplink shared channel (SCH) based on radio resource allocation information included in the response information (S17030). In this case, the uplink transmission may also be expressed as scheduled transmission.

After the eNB receives the uplink transmission from the UE, it transmits a message (also expressed as a message 4) for a contention resolution to the UE through a downlink shared channel (DL-SCH) (S7040).

Next, a non-contention-based random access procedure is described with reference to FIG. 7(b).

An eNB allocates a non-contention random access preamble to a UE before the UE transmits a random access preamble (S7110).

The non-contention random access preamble may be allocated through a handover command or dedicated signaling, such as a PDCCH. If a non-contention random access preamble has been allocated to the UE, the UE transmits the allocated non-contention random access preamble to the eNB (S7120).

Thereafter, the eNB may transmit a random access response (also expressed as a message 2) to the UE as in step S7020 in the contention-based random access procedure (S7130).

In the aforementioned random access procedure, an HARQ is not applied to a random access response, but an HARQ may be applied to uplink transmission for a random access response or a message for a contention resolution. Accordingly, a UE does not need to transmit ACK or NACK with respect to a random access response.

An UL data transmission method in LTE(-A) or 802.16 is described in brief.

A cellular system, such as the LTE(-A) system or 802.16m, uses a resource allocation method based on eNB scheduling.

In a system using such an eNB scheduling-based resource allocation method, a UE having data (i.e., UL data) to be transmitted requests a resource for corresponding data transmission from an eNB before it transmits data.

Such a scheduling request of the UE may be performed through scheduling request (SR) transmission on a PUCCH or buffer status report (BSR) transmission on a PUSCH.

Furthermore, if a resource that will transmit an SR or BSR has not been allocated to a UE, the UE may request an uplink resource from an eNB through an RACH procedure.

The eNB that has received the scheduling request from the UE as described above allocates an uplink resource to be used by the corresponding UE to the UE through a downlink control channel (i.e., an UL grant message, DCI in the case of LTE(-A)).

In this case, the UL grant transmitted to the UE may notify that a resource allocated to the UE corresponds to a resource of which subframe by explicitly signaling the resource, but the time agreed between a UE and an eNB may be defined through resource allocation for a subframe after specific timing (e.g., 4 ms in the case of LTE).

As described above, what the eNB allocate resources to the UE after X ms (e.g., 4 ms in the case of LTE(-A)) means that the resource of the UE is allocated by taking into consideration the entire time taken for the UE to receive and decode an UL grant and to prepare and encode data to be transmitted.

EMM and ECM State

EPS mobility management (EMM) and EPS connection management (ECM) states are described.

FIG. 8 is a diagram illustrating the EMM and ECM states in a wireless communication system to which the present invention may be applied.

Referring to FIG. 8, in order to manage the mobility of a UE in the NAS layer located in the control plane of the UE and an MME, an EMM registration state (EMM-REGISTERED) and an EMM deregistration state (EMM-DEREGISTERED) may be defined depending on whether the UE has been attached to or detached from a network. The EMM-REGISTERED state and the EMM-DEREGISTERED state may be applied to the UE and the MME.

As in the case where power of a UE is first turned on, the UE may be initially in the EMM-DEREGISTERED state. The UE performs a process of being registered with a corresponding network through an initial access procedure in order to access the network. When the access procedure is successfully performed, the UE and the MME make transition to the EMM-REGISTERED state. Furthermore, when power of the UE is turned off or in the case of a radio link failure (if a packet error rate on a radio link exceeds a reference value), the UE is detached from a network and makes transition to the EMM-DEREGISTERED state.

Furthermore, in order to manage a signaling connection between a UE and a network, an ECM connection state (ECM-CONNECTED) and an ECM idle state (ECM-IDLE) may be defined. The ECM-CONNECTED state and the ECM-IDLE state may also be applied to the UE and the MME.

Furthermore, the RRC state between a UE and an eNB indicates whether the RRC layer of the UE and the RRC layer of the eNB have been logically connected. That is, if the RRC layer of the UE and the RRC layer of the eNB have been connected, the UE is in the RRC connection state (RRC_CONNECTED). If the RRC layer of the UE and the RRC layer of the eNB have not been connected, the UE is in the RRC idle state (RRC_IDLE).

Form in which ECM State has been Associated with RRC State

An ECM connection includes an RRC connection established between a UE and an eNB and an S1 signaling connection established between an eNB and an MME. That is, what an ECM connection has been established/released means that both an RRC connection and an S1 signaling connection have been established/released.

A network may confirm the presence of a UE in the ECM-CONNECTED & RRC-CONNECTED state in a cell unit, and may effectively control the UE.

In contrast, the network cannot confirm the presence of a UE in the ECM-IDLE state, and a core network (CN) performs management in a tracking area unit, that is, an area unit greater than a cell. When a UE is in the ECM idle state, the UE performs discontinuous reception (DRX) configured by the NAS using an ID uniquely assigned in a tracking area. That is, the UE may receive the broadcasting of system information and paging information by monitoring a paging signal at a specific paging occasion every UE-specific paging DRX cycle.

Furthermore, when a UE is in the ECM-IDLE state, a network does not have context information of the UE. Accordingly, the UE in the ECM-IDLE state may perform a UE-based mobility-related procedure, such as cell selection or cell reselection, without a need to receive a command from a network. If the location of a UE is different from a location known to a network in the ECM idle state, the UE may notify the network of the location of the corresponding UE through a tracking area update (TAU) procedure.

In contrast, when a UE is in the ECM-CONNECTED & RRC-CONNECTED state, the mobility of the UE is managed by a command of a network. In the ECM-CONNECTED & RRC-CONNECTED state, the network is aware of a cell to which the UE belongs. Accordingly, the network transmits and/or receives data to the UE or from the UE, may control mobility, such as handover of the UE, and may perform cell measurement for a neighboring cell.

As described above, in order for a UE to receive common mobile communication services such as voice or data, the UE needs to make transition to the ECM-CONNECTED & RRC-CONNECTED state. As in the case where power of a UE is initially turned on, the UE may be initially in the ECM-IDLE state as in the EMM state. When the UE is successfully registered with a corresponding network through an initial access procedure, the UE and the MME make transition to the ECM connection state. Furthermore, when the UE has been registered with the network, but traffic has been deactivated and thus a radio resource has not been allocated to the UE, the UE is in the ECM-IDLE state. When uplink or downlink new traffic occurs in a corresponding UE, the UE and the MME make transition to the ECM-CONNECTED state through a service request procedure.

Form in which ECM State has not been Associated with RRC State

An ECM connection includes an RRC connection established between a UE and an eNB and an S1 signaling connection established between an eNB and an MME, but may be not related to the RRC state. That is, the ECM stat between the UE and the MME can maintain the connection state although the RRC state shifts from the connection state to the idle state.

The operations of a network/eNB and a U in the ECM-CONNECTED & RRC-CONNECTED state and the ECM-IDLE state may be the same as the contents in Form in which the ECM state has been associated with the RRC state.

A network in the ECM-CONNECTED & RRC-IDLE state performs the same operation as that in the ECM-CONNECTED state, but may manage the mobility of a UE in a specific of an eNB and the UE and reconfigure a connection (e.g., an S1 signaling connection, S1 data connection) path with an MME/S-GW.

Accordingly, the UE may perform a different operation as follows depending on its state.

ECM-IDLE
Message transmission for ECM and RRC connection state transition
ECM-CONNECTED & RRC-IDLE (excluding RRC-IDLE of a UE according to a radio link failure): RRC connection state transition and message transmission for connection resumption
ECM-CONNECTED & RRC-IDLE (RRC-IDLE of a UE according to a radio link failure): message transmission for an RRC connection reconfiguration Examples of wireless communication system architecture for supporting a next-generation RAN to which methods proposed in this specification may be applied are described with reference to FIGS. 9 to 11.

FIG. 9 is a diagram showing an example of wireless communication system architecture for supporting a next-generation RAN to which methods proposed in this specification may be applied.

Wireless communication system architecture for supporting a next-generation RAN may be expressed "high level architecture."

A next generation may be simply expressed as "Next Gen", and the next generation may be commonly called a term that refers to a future communication generation including 5G, etc.

For convenience of description, a next generation is hereinafter expressed as or called "Next Gen."

The architecture of "Next Gen" to which methods proposed in this specification may be applied can support a new RAT(s), evolved LTE and non-3GPP access types.

Examples of the non-3GPP access types may include WLAN access, Fixed access, etc.

Furthermore, the "Next Gen" architecture supports a unified authentication framework with respect to other access systems, and supports a simultaneous connection with multiple UEs through multiple access technologies.

Furthermore, the "Next Gen" architecture permits the independent evolution of a core network and RAN and minimizes access dependency.

Furthermore, the "Next Gen" architecture supports the separation of control plane and user plane functions, and supports the transmission of IP packets, non-IP PDUs and Ethernet frames.

Referring to FIG. 9, the "Next Gen" architecture may include a NextGen UE 910, a NextGen RAN 920, a NextGen Core 930, and a Data network 940.

In this case, in a wireless communication system of "Next Gen", a UE may be expressed as the "NextGen UE", a RAN defining radio protocol architecture between a UE and an eNB may be expressed as the "NextGen RAN", and a Core Network performing mobility control of a UE, IP packet flow management, etc. may be expressed the "NextGen Core."

For example, the "NextGen RAN" may correspond to the E-UTRAN in the LTE(-A) system. The "NextGen Core" may correspond to EPC in the LTE(-A) system. Network entities performing the same functions as the MME, S-GW and P-GW in LTE EPC may be included in the NextGen Core.

An NG1-C interface and an NG1-U interface are present between the NextGen RAN and the NextGen Core. An NG-Gi interface is present between the NextGen Core and the Data Network.

In this case, the NG1-C indicates a reference point for a control plane between the NextGen RAN and the NextGen Core. The NG1-U indicates a reference point for a user plane between the NextGen RAN and the NextGen Core.

Although not shown in FIG. 15, an NG-NAS indicates a reference point for a control plane between the NextGen UE and the NextGen Core.

Furthermore, the NG-Gi indicates a reference point between the NextGen Core and the Data network.

In this case, the Data network may be an operator external public network or a private data network or an intra-operator data network.

FIG. 10 is a diagram showing an example of a flow-based QoS structure to which methods proposed in this specification may be applied.

In particular, FIG. 10 shows that the NextGen Core of FIG. 9 has been subdivided into a control plane (CP) function and a user plane (UP) function and shows an interface between a UE/AN/AF in detail.

A flow-based QoS handling method is described more specifically with reference to FIG. 10.

Referring to FIG. 10, in a wireless communication system to which the present invention is applied, the policy of quality of service (QoS) may be stored and configured in a control plane (CP) function 10030 due to the following causes.

Application in a user plane (UP) function 10040
Admission control (AC) 29020 for QoS application and transmission in a UE 10010

Parameters for defining a QoS framework are described below.

Flow Priority Indicator (FPI): indicate a parameter to define the priority of each flow processing in the UP Functions 10040 and AN Functions 10020. This corresponds to priority in a congestion case in addition to scheduling priority.

Furthermore, the FPI indicates whether the flow requires a guaranteed flow bit rate and/or a maximum flow bit rate.

Flow Descriptor: packet filters related to specific flow processing. In the uplink, identification needs to be performed in the UE and the AN 10020, but is limited to layer 3 and layer 4.

Maximum Flow Bitrate (MFB): a parameter indicative of an uplink and downlink bit rate value that may be applied for one flow or a combination of flows.

The parameter indicates a maximum bit rate authorized for a data flow.

Flow Priority Level (FPL): it is a parameter to define the state importance of a flow for accessing the AN 10020 resource. Additionally, the FPL indicates whether an AN 10020 non-prioritized resource has been accessed. The AN non-prioritized resource must be an allocated resource that is previously emptable or protected against pre-emption.

Session Bitrate: a parameter indicative of a bit rate value in the uplink and downlink for establishing a user session. The Session Bitrate parameter indicates a maximum bit rate authorized for a user session.

In the UE, the support of a GFP depends on the QoS design of a radio interface.

As shown in FIG. 10, the CP functions and the UP functions are functions included in the NextGen CN (indicated by a dotted line), and may be implemented by one physical device or may be implemented by different physical devices.

FIG. 11 is a diagram showing an example of interactions and functions between network functions.

Content Requirement Awareness Function in the Core (CAF-Core)

A CAF-Core 11030 supports a mechanism for identifying application sessions (e.g., video download, web page download, listening to music, and posting for a social media network) and performing QoS policies related to a discovered application.

The CAF-Core receives QoS policies from a Core CP. The application discovery is performed as means for non-standardized algorithms (e.g., use pattern, heuristics, and SNF discovery for ciphered traffic).

The CAF performs QoS execution in a CN based on the QoS policies received from the Core CP.

The CAF-Core may process the QoS policies, and may obtain dynamic QoS targets and local execution actions from the CN.

Furthermore, the CAF-Core may update user plane traffic mix, simultaneous competing flows, and the current content requirements of a network status and resource availability in real time based on the plane traffic mix, simultaneous competing flows, and current content requirements of a network status and resource availability within the limits of the QoS policies provided by the NG Core CP functions. As described above, the CAF-Core executes the QoS policies within the given policy limits and may not have any deviation other than any range.

Content Requirement Awareness Function in the RAN (CAF-RAN)

A CAF-RAN 11010 supports a mechanism for identifying application sessions (e.g., video download, web page download, listening to music, posting for a social media network) and executing QoS policies.

The CAF-RAN receives QoS policies from a Core CP. The CAF-RAN uses application discovery information provided by the Core. The application discovery information may imply additional specific requirements for a certain application session and may also form traffic for a given session. The CAF-RAN performs QoS execution based on the QoS policies received from the Core CP. This includes traffic forming for DL and UL. The DL traffic forming helps to control a flow of UL traffic.

The CAF-RAN may process the QoS policies and obtain QoS targets and local execution actions that are dynamic in the RAN. Furthermore, the CAF-RAN may update user plane traffic mix, simultaneous competing flows, and the current content requirements of a network status and resource availability in real time based the user plane traffic mix, simultaneous competing flows, and current content requirements of a network status and resource availability within the limits of the QoS policies provided by the NG Core. As described above, the CAF-RAN executes the QoS policies within the given policy limits and may not have any deviation other than any range.

The RAN is restricted by charging performed in the core and thus has not influence on charging performed in the UP function within the core. The amount of specific traffic charged by the Core is provided to the RAN in relation to packet marking along with application marking, and the CAF-RAN executes and preserves a charged capacity in relation to bits.

Coordination Between CAF-Core and CAF-RAN

A CAF-Core may perform application discovery and provide information of a packet marking form based on policies received from a CN CP.

Traffic forming and policy execution in the CAF-RAN are restricted by packet marking indicated by policies received from a CAF-Core and CN CP. This helps the CAF-Core and the CAF-RAN to operate in a cooperative method. Furthermore, the charging is performed for an application indicated by the CAF-Core.

A CN CP Function and a CN UP Function are described below.

The CN CP Function and the CN UP Function may be implemented by one physical device or respective physical devices.

CN CP Function

QoS policies are stored in CN CP Functions. In session forming, subscriber and application specific policies are transmitted to an RAN and a CAF present in the CN UP Function.

CN UP Function

In the core, the UP Function is responsible for traffic charging support (CDR, granted quota for on-line) based on policies in which the outcome of a CAF has been taken into consideration. Furthermore, the CN UP function marks downlink traffic transmitted to an RAN.

Policy Provisioning and Enforcement

An operator supplies specific QoS policies to the subscriber and application of an NG Core Cp function. The CP function of the core provides the policies to the RAN and CN UP function.

The execution actions are obtained from the policy points based on the user plane traffic mix, simultaneous competing flows, and the current content requirements of a network status and resource availability.

Charging

Traffic charging 11020 support (CDR, granted quota for on-line) based on policies in which the outcome of a CAF has been taken into consideration is performed in the CN UP function.

Multiple Levels of Policies

The following shows another configuration of UP functions and QoS policies provided to an RAN.

Intent level QoS policies showing the configuration of a flow may be identified by packet marking, an SDF descriptor, etc. within an abstract QoS target (e.g., if Voice type Qos, Smoothed Bit rate Qos (limit the bandwidth variation for the traffic) or bulk traffic (radio conditions) is not good or the load of a cell is excessive, traffic may be discarded)).

Transmission QoS level policies showing the configuration of a flow may be identified by packet marking, an SDF descriptor, etc. within explicit QoS targets (priority, delay, jitter, etc.).

The CP function of the CAF-RAN and CAF-Core is responsible for Transport locally map Intent level QoS policies belonging to QoS level policies based on local CAF policies and a local (radio) condition (a current context of user plane traffic mix, simultaneous competing flows, and network status and resource availability), and is restricted by the upper limits of intent level QoS policies.

Parameters Necessary for QoS Framework

The following parameters are necessary for QoS framework definition.

Policy description:

Range of definition: application name or application type

Definition of Intent: High Definition experience or explicit QoS target level (e.g., maximum packet delay 150 ms for .IMS video) for RT multimedia Maximum Flow Bitrate: UL and DL bit rate value applicable for a single PDU session or the coupling of PDU sessions for a given UE.

Allocation and Retention Priority level (ARP): per-emption capability and a priority level meaning pre-emption vulnerability for a given PDU session.

FIG. 12 is a flowchart showing an example of a method of transmitting uplink data in the state in which a UE has not established a connection with a network node, to which the present invention may be applied.

FIGS. 12(a) and 12(b) show procedures for a UE to receive a resource allocated thereto from an eNB and to transmit uplink data in a process of performing a random access procedure without forming a connection with the eNB.

In this case, a procedure for the UE to transmit and receive data in the state in which the UE has not established a connection with the eNB (e.g., RRC_Idle state or ECM_Idle state) may be called a connectionless based data transmission procedure or an RRC connectionless transmission procedure.

Referring to FIG. 12(a), the UE performs a random access procedure in order to obtain an uplink radio resource for transmitting uplink data in the state in which a connection between the UE and the eNB has not been established (S12010). In this case, the random access procedure means that up to steps S7010 and S7020 described in FIG. 7 (a) are performed.

That is, the random access procedure means only up to the step of the UE to transmit a random access preamble to the eNB and to receive a random access response message as a response thereto.

In this case, the random access response message may include the index of a preamble discovered by the eNB, timing alignment (TA) indicative of timing offset information for synchronization, radio resource allocation information used in the uplink, and a temporary identifier (e.g., temporary C-RNTI) for UE identification.

The UE transmits uplink data to the eNB (or network node) through an allocated resource if the resource allocated through the random access response message based on radio resource allocation information is a size sufficient to transmit the uplink data to be transmitted by the UE (S12020).

However, if the allocated resource is not a size sufficient to transmit the uplink data, the UE requests a resource for the transmission of the uplink data and transmits the uplink data, as shown in FIG. 12(b).

That is, as in FIG. 12(a), the UE that has performed the random access procedure transmits a resource request message in order to request a resource for the transmission of the uplink data to the network node if the resource allocated through the random access response message is not a size sufficient to transmit the uplink data (S12110, S12120).

The request message may include size information of the data uplink or size information of the resource to be allocated in order to request the resource for the transmission of the uplink data.

The network node allocates a resource to the UE in response to the request message, includes the allocated resource information in a response message, and transmits the response to the UE (S12130).

The UE transmits the uplink data to the network node through the resource allocated by the network node (S12140).

As described above, although a connection with a network node has not been established, a UE can receive a resource allocated thereto from a network node and transmit uplink data.

FIG. 13 is a flowchart showing an example of a method for a UE to receive downlink data in the state in which a connection with a network node has not been established, to which the present invention may be applied.

FIGS. 13(a) and 13(b) show procedures for a UE to receive a resource allocated thereto from an eNB and to transmit downlink data in a process of performing a random access procedure without forming a connection between the eNB.

In this case, the procedure for the UE to transmit and receive data in the state in which a connection with the eNB has not been established (e.g., RRC_Idle state or ECM_Idle state) may be called a connectionless based data transmission procedure or an RRC connectionless transmission procedure.

Referring to FIG. 13(a), when downlink data transmitted to the UE occurs, the network node transmits a paging message in order to wake the UE up because a connection between the UE and the network node has not been established (S13010).

Thereafter, the UE and the network node perform a random access procedure as in 18010 of FIG. 18 (S13020). The UE transmits information for the verification of the UE to the network node through a resource allocated in the random access procedure (S13030).

The information for the verification of the UE may include a UE ID for identifying the UE, a security header type (e.g., not security protected, Integrity protected, Integrity protected and ciphered), a key set identifier to identify security context, an NAS count, and message authentication code (MAC).

When the verification of the UE is completed, the network node transmits downlink data to the UE (S13040).

However, if a resource allocated through the random access procedure is not a size sufficient to transmit the information for the verification of the UE, the UE requests a resource and transmits information for the verification of the UE, as shown in FIG. 13(b).

That is, as in FIG. 13(b), the UE that has performed the random access procedure transmits a resource request message in order to request a resource for the transmission of information for the verification of the UE to the network node if a resource allocated through the random access response message is not a size sufficient to transmit the information for the verification of the UE (S13110, S13120, S13130).

The request message may include size information of the information for the verification of the UE or size information of a resource to be allocated in order to request the resource for the transmission of the information for the verification of the UE.

The network node allocates the resource to the UE in response to the request message, includes the allocated resource information in a response message, and transmits the response message to the UE (S13140).

The UE transmits the information for the verification of the UE to the network node through the resource allocated by the network node (S13150).

When the verification of the UE is completed, the network node transmits downlink data to the UE (S13160).

Although a UE has not established a connection with a network node as described above, the UE can receive a resource allocated thereto from the network node, can transmit information for the verification of the UE, and can receive downlink data through the UE verification.

However, if a UE and a network node transmit and receive data through the methods described in FIGS. 12 and 13, there is a need to differentially allocate a resource to the UE depending on the requirements of a service because required quality is different depending on services.

For example, in the case of services sensitive to delay (e.g., Delay sensitive service or Low latency service) and services not sensitive to delay (e.g., Delay tolerant service), a resource needs to be differentially allocated to a UE depending on the requirements of each service.

An example of the services sensitive to delay may include the following services.

Ultra-high availability and reliability (e.g., eHealth service directly related to life and 3D connectivity service, such as a public safety service drone) having requirements of Table 3.

TABLE 3

| No. 13 | Ultra-high availability and reliability | |
|---|---|---|
| Main Attributes | Requirement KPI | Notes |
| User Experienced Data Rate (also at the cell edge) | DL: 10 Mbps UL: 10 Mpbs | Data rate enabling real-time video and data transfers (e.g. maps) |
| E2E latency | 10 ms | |
| Mobility | On demand. 0-500 km/h | |
| Device autonomy | >3 days (standard) Up to several years for some critical MTC services | |
| Connection Density | Not critical | |
| Traffic Density | Potentially high | |

Smart grid system with distributed sensors and management that require instant responses
delay requirements <8 ms, message size 200~1521 bytes
Remote control (e.g., cloud robotics, industrial factory automatic)
delay requirements ≤10 ms, message size 100 bytes An example of the services not sensitive to delay may include the following services.
Keep alive message service having a connection retention object of an application itself
Instant message service, such as a user state change Accordingly, the present invention proposes a method of transmitting data for providing services by differentially allocating resources to a UE based on the requirements of a service.

FIGS. 14 to 16 are diagrams showing examples of a method of differentially allocating a resource based on the transmission direction and size of data to which the present invention may be applied.

FIG. 14(a) shows an example of resource group classification according to the direction of data and the size of data to be transmitted by a UE, and FIG. 14(b) shows an example of preamble sequences corresponding to classified resource groups.

FIG. 15 shows an example of subframes in which preambles are transmitted based on a classified resource group.

FIG. 16 shows an example of channels in which preambles are transmitted based on a classified resource group.

Referring to FIGS. 14 to 16, a network node may allocate resources based on a preamble sequence transmitted by a UE, a subframe in which the preamble sequence is received or a resource group corresponding to a channel in which the preamble sequence has been received so that data can be transmitted to the UE in the connectionless state.

Specifically, differences, such as Table 4, are present between random access in a connection based transmission and reception system and random access in a connectionless based transmission and reception system.

TABLE 4

| | Connection based data transmission and reception | Connectionless based data transmission and reception |
|---|---|---|
| the purpose of Random access of UE | Uplink resource acquisition uplink data connection and mobility-related information of UE | Uplink resource acquisition uplink data UE verification-related information for downlink data reception |
| Scheduling contention target in service aspect | uplink data of each UE | uplink data of each UE UE verification-related information for downlink data reception of each UE |
| Scheduling consideration in service aspect | uplink data quality characteristic of each UE | uplink data quality characteristic of each UE downlink data quality characteristic of each UE data transmission direction (additionally considered because transmission and reception delay is different depending on data transmission direction) |

As in Table 4, in the connectionless based transmission and reception, delay occurring depending on the transmission direction of data in addition to the characteristic of uplink and downlink data is different. Accordingly, an eNB needs to allocate a resource to a UE by taking into consideration the transmission direction of data.

That is, a resource for transmitting data is limited, and thus an eNB needs to determine the priority of resource allocation based on the requirements of a service provided by a UE.

Furthermore, the size of data also needs to be taken into consideration for resource allocation because occurring delay is different depending on whether all of pieces of information related to the verification of a UE for uplink data to be transmitted by the UE or the reception of downlink data can be transmitted through an uplink resource obtained through a random access process.

Examples of consideration for resource allocation may include a delay time indicative of the time when data must be transmitted, the transmission direction of data, the state of a channel, the amount of transmission per second, an error rate, whether a resource is scheduled through which scheduler, an algorithm for resource allocation, etc.

An eNB needs to allocate a resource to a UE by taking into consideration the purpose of random access of the UE and the size of data transmitted by the UE as described above. To this end, the eNB divides resource groups based on the purpose of random access and size, and classifies a preamble sequence, a resource (e.g., subframe) on a time axis or a resource (e.g., a channel for random access) on a frequency axis based on the divided resource groups. Accordingly, the eNB can recognize the purpose of random access of the UE and the size of data to be transmitted, and can differentially allocate a resource to the UE based on the purpose of random access and the size.

For example, as shown in FIG. 14(a), resource groups may be divided into A, B and C depending on whether the direction of data to be transmitted by a UE is uplink or downlink and the size of uplink data.

If the purpose of random access and the size of data are to be indicated through a preamble, the resource groups divided into A, B and C may correspond to respective preamble sequence sets as shown in FIG. 14(b). Preamble sequences may be classified based on the preamble sequence set.

That is, preamble sequences 0 to 15 are included in a preamble sequence set A corresponding to a random access resource group A, 16 to 31 are included in a preamble sequence set B corresponding to a random access resource group B, and 32 to 47 are included in a preamble sequence set C corresponding to a random access resource group C.

A UE may notify an eNB of the direction and size of data to be transmitted by the UE by selecting and transmitting a preamble sequence included in the preamble sequence sets. An eNB may recognize a resource group corresponding to a preamble sequence through the preamble sequence received from the UE, may recognize the transmission and reception direction and size of the data through the recognized resource group, and may allocate a resource to the UE.

Unlike in FIG. 14(b), each of resource groups divided based on the purpose of random access and the size of data may correspond to a resource of a time domain or a resource of a frequency domain.

For example, as shown FIGS. 15 and 16, the resource groups A, B and C classified based on the transmission and reception direction and size of data may be made to correspond to a subframe in a time domain for transmitting a preamble sequence or a channel for random access in a frequency domain.

A UE may select a resource group based on its own purpose of random access and size, and may transmit a preamble sequence to an eNB through a subframe or a channel for random access corresponding to the selected resource group.

The eNB may recognize the transmission direction and size of the data based on that a preamble transmitted by the UE is transmitted in which subframe or which channel for random access, and may differentially allocate a resource to the UE depending on the transmission direction and size of the data.

The classification of resource groups, information of a preamble sequence configured based on a classified resource group, resource information in the time domain, and resource information in the frequency domain, described in FIGS. 14 to 16, may be transmitted to a UE through system information of an eNB.

FIG. 17 is a flowchart showing an example of a method of differentially allocating a resource based on the transmission direction and size of data to which the present invention may be applied.

As shown in FIG. 17, a UE trying to transmit uplink data selects one preamble sequence included in a specific preamble set based on the attributes (transmission direction, data size) of the data from among the preamble sets described in FIG. 14(b), and transmits the selected preamble sequence to an eNB. If a resource allocated by the eNB is sufficient to transmit the uplink data, the UE transmits the uplink data. If not, the UE receives a resource additionally allocated thereto from the eNB and transmits the uplink data.

FIG. 17(a) shows an example of a case where the resource of a UE allocated by an eNB is sufficient to transmit uplink data, and FIG. 17(b) shows an example of a case where the resource of a UE allocated by an eNB is not sufficient to transmit uplink data.

As shown in FIGS. 17(a) and 17(b), the UE select a preamble of a specific preamble set based on the transmission direction and size of data from among preamble sets configured based on the transmission directions and sizes of data, and transmits the preamble to the eNB (S17010, S17110).

The eNB receives and detects the preamble transmitted by the UE, and may recognize the purpose of random access of the UE and the size of data based on the detected preamble.

That is, the eNB may recognize that the UE has attempted random access for the transmission of the uplink data and that the size of the uplink data is which degree through a resource group corresponding to the preamble sequence set including the received preamble.

The eNB allocates a resource to the UE based on the recognized direction of the data and the size of the data, and transmits a response message, including resource information indicating the allocated resource and the received preamble, to the UE (S17020, S17120).

The UE transmits the uplink data to the eNB through the resource allocated by the eNB (S17030).

However, if the resource of the UE allocated by the eNB is not sufficient to transmit the uplink data, the UE transmits a resource request message to request a resource for the transmission of the uplink data to the eNB through the allocated resource (S17130).

The eNB allocates a resource for the transmission of the uplink data to the UE based on the resource request message transmitted by the UE, and transmits resource information indicative of the allocated resource to the UE (S17140).

The UE transmits the uplink data to the eNB through the resource allocated by the eNB (S17150).

Through such a method, a UE can notify an eNB of the transmission direction of data, indicating whether the UE is a UE attempting to transmit data to the eNB or a UE attempting to receive data, and/or the size of the data to be transmitted by transmitting a preamble. The eNB may allocate a resource to the UE based on the transmitted preamble.

FIG. 18 is a flowchart showing another example of a method of differentially allocating a resource based on the transmission direction and size of data to which the present invention may be applied.

As shown in FIG. 18, a UE attempting to receive downlink data may select one preamble sequence including a specific preamble set based on data attributes (e.g., transmission direction) from among the preamble sets described in FIG. 14(b), may transmit the selected preamble sequence to an eNB, may transmit verification information of the UE for receiving the downlink data through a resource allocated by the eNB, and may receive the downlink data from the eNB. The UE is in the idle state when the UE has not established an RRC connection with the eNB. Accordingly, the eNB transmits a paging message to the UE in order to notify the UE in the idle state that there is data to be transmitted (S18010).

The paging message includes a UE ID indicating the UE that receives the downlink data and quality of service (QoS) information indicating quality that is required for the transmission of the downlink data.

The UE in the idle state performs a random access procedure along with the eNB in order to receive the downlink data from the eNB.

That is, the UE selects a preamble within a specific preamble set classified for the reception of the downlink data from among the preamble sets described in FIG. 14(b) based on the transmission direction and size of data, and transmits the preamble to the eNB (S18020).

The eNB may receive and detect the preamble transmitted by the UE and recognize the purpose of random access of the UE based on the detected preamble.

That is, the eNB may recognize that the UE has attempted random access for the reception of the downlink data through a resource group corresponding to the preamble sequence set including the received preamble. The eNB that has recognized that the data transmission direction is downlink allocates a resource to the UE based on the size of verification information for the verification of the UE, and transmits a response message, including resource information indicative of the allocated resource and the received preamble, to the UE (S18030).

The UE transmits verification information to the eNB through the resource allocated by the eNB (S18040).

The verification information may include the following information in order to verity the UE that receives the downlink data.

UE identifier (ID) for identifying a UE
security header type (e.g., not security protected, Integrity protected, Integrity protected and ciphered)
key set identifier for identifying security context
NAS count information
message authentication code (MAC)

The eNB that has verified that the UE is a UE that will receive the downlink data through the verification information transmitted by the UE transmits the downlink data to the UE (S18050).

FIG. 19 is a flowchart showing another example of a method of differentially allocating a resource based on the transmission direction and size of data to which the present invention may be applied.

Referring to FIG. 19, an eNB may recognize the direction of data and the size of data to be transmitted and received by each UE through preambles transmitted by multiple UEs, and may differentially allocate resources to the UEs based on the direction and size of the data.

Specifically, a case where UEs 1, 2 and 3 attempt to transmit and receive data having transmission and reception directions and sizes, such as Table 5, is described as an example.

TABLE 5

|  | UE 1 | UE 2 | UE 3 |
|---|---|---|---|
| Data transmission and reception direction | uplink | downlink | uplink |
| Size of uplink data | uplink data ≥ verification information of UE | | uplink data ≤ verification information of UE |

It is assumed that an eNB has not established an RRC connection with the UEs 1, 2 and 3 and.

If downlink data to be transmitted to the UE 2 occurs, the eNB transmits a paging message to the UE 2 in order to notify the UE 2 of an idle state that there is the downlink data to be received by the UE 2 (S19010).

The paging message includes a UE ID indicative of the UE that receives the downlink data and quality of service (QoS) information indicative of quality that is required for the transmission of the downlink data.

The UE 2 selects a preamble included in a specific preamble set corresponding to a resource group classified for the reception of the downlink data from among the preamble sets described in FIG. 14(*b*) based on the transmission direction and size of data, and transmits the preamble to the eNB.

If each of the UE 1 and the UE 3 has uplink data to be transmitted to the eNB, the UE selects a preamble included in a specific preamble set corresponding to a resource group classified based on the transmission of the uplink data and the size of the uplink data from among preamble sets configured based on the transmission direction and size of data, and transmits the preamble to the eNB (S19020).

The eNB detects the preambles received from the UE 1, the UE 2, and the UE 3, and differentially allocates resources to the UE 1, the UE 2 and the UE 3 based on the received preambles (S19030).

For example, the data transmission and reception direction of the UE 1 is uplink, and the size of the uplink data is greater than verification information of the UE for the reception of the downlink data.

Accordingly, if the data transmission delay requirements of the UE 1, the UE 2 and the UE 3 are the same, the time taken for the UE 1 to transmit data is longer than the time taken for the UE 2 and the UE 3 because the UE 1 has to transmit the data to the eNB through an additional resource request. That is, since the delay time of the UE 1 for the transmission of the data is long, the eNB first allocates a resource to the UE 1 before the UE 2 and the UE 3, generates a response message including resource information indicative of the allocated resource and the preamble transmitted by the UE 1, and transmits the response message to the UE 1 (S19040).

To include the preamble in the response message is for indicating that a resource indicated by the resource information included in the response message has been allocated to the UE 1.

The UE 2 may receive downlink data from the eNB after it transmits verification information to the eNB because the transmission and reception direction of data is downlink.

That is, the time taken to receive downlink data is longer than the time taken to transmit uplink data at once. That is, since a delay time for the reception of the downlink data is longer than a delay time for the transmission of the uplink data, the eNB first allocate a resource to the UE 2 before the UE 3, generates a response message including resource information indicative of the allocated resource and the preamble transmitted by the UE 2, and transmits the response message to the UE 2 (S19050).

Thereafter, the eNB allocates a resource to the UE 3, generates a response message including resource information indicative of the allocated resource and the preamble transmitted by the UE 3, and transmits the response message to the UE 3 (S19070).

The UE 1 cannot transmit the uplink data through the resource allocated by the eNB through step S19040 because the size of the uplink data to be transmitted is greater than the verification information of the UE.

Accordingly, the UE 1 transmits a resource request message to request a resource for the transmission of the uplink data through the resource allocated through step S19040 (S19060).

The eNB allocates a resource for the transmission of the uplink data to the UE 1 based on the resource request message received from the UE 1, and transmits resource information indicative of the allocated resource to the UE (S19090).

The UE transmits the uplink data to the eNB through the resource allocated by the eNB (S19110).

The UE 2 transmits verification information to the eNB using the resource allocated through step S19050 (S19080).

The eNB verifies whether the UE 2 is a UE that will receive the downlink data through the verification information received from the UE 2, and transmits the downlink data to the UE 2 when the verification is completed (S19120).

The verification information may include the following information in order to verify the UE that receives the downlink data.

- UE identifier (1D) for identifying a UE
- security header type (e.g., not security protected, Integrity protected, Integrity protected and ciphered)
- key set identifier for identifying security context
- NAS count information
- message authentication code (MAC)

The UE 3 does not need to request an additional resource from the eNB because the size of the uplink data to be transmitted by the UE 3 is smaller than the size of verification information.

Accordingly, the UE 3 may transmit the uplink data to the eNB through the resource allocated through step S19070 (S19100).

Through such a method, an eNB can differentially allocate resources to UEs based on the direction and size of data to be transmitted and received by the UEs, and can efficiently perform resource allocation by preferentially allocating a resource if the delay of data transmission and reception is great through differential resource allocation.

FIGS. 20 to 24 are diagrams showing examples of a method for transmitting configuration information related to resources classified based on the transmission direction and size of data, to which the present invention may be applied.

FIG. 20 shows a method for transmitting information of a preamble sequence, a subframe in a time domain, and a random access channel in a frequency domain classified based on the purpose of random access to a UE.

FIGS. 21 and 22 show examples of subframes in a time domain classified based on the purpose of random access.

FIGS. 23 and 24 show examples of frequency domains classified based on the purpose of random access.

If a preamble sequence, a subframe and a random access channel are classified based on the purpose of random access (e.g., depending on the transmission of uplink data or the reception of downlink data), an eNB transmits configuration information related to the classified preamble sequence, subframe and/or random access channel to the UE so that the UE can recognize the classified preamble sequence, subframe and/or random access channel (S20010).

The configuration information may be transmitted to the UE in a broadcast manner, multicast manner or unicast manner.

A random access eNB may include information related to a preamble sequence, subframe and random access channel classified based on the purpose of random access in configuration information using various methods.

First, if preamble sequences are classified or allocated as in Table 6 or Table 7 based on the purpose of random access (e.g., the transmission direction of data), an eNB may include number information of preamble sequences classified or allocated for each purpose of random access in configuration information, and may transmit the configuration information.

TABLE 6

| The purpose of Random access | Preamble sequence index |
|---|---|
| uplink data transmission | 0~31 |
| downlink data reception | 32~63 |

TABLE 7

| The purpose of Random access | Preamble sequence index |
|---|---|
| uplink data transmission | 0~15 |
| downlink data reception | 16~47 |

That is, an eNB may include number information of a preamble sequence allocated for the transmission of uplink data and number information of a preamble sequence allocated for the reception of downlink data in configuration information, and may transmit the configuration information to a UE.

Alternatively, the eNB may include number information of a preamble sequence allocated for a specific purpose of random access in configuration information, and may transmit the configuration information.

That is, the eNB may include number information of a preamble sequence allocated for the transmission of uplink data or number information of a preamble sequence allocated for the reception of downlink data in configuration information, and may transmit the configuration information to the UE. Second, if a preamble sequence set is classified based on the purpose of random access, an eNB may include index information of the classified preamble sequence set in configuration information, and may transmit the configuration information to a UE.

For example, if a preamble sequence set is configured as in Table 8 and a preamble sequence set is classified based on the purpose of random access as in Table 9 or Table 10, index information of a preamble sequence set allocated for each purpose of random access may be included in configuration information and transmitted.

TABLE 8

| Preamble sequence set | Preamble sequence index |
|---|---|
| 0 | 0~15 |
| 1 | 16~31 |
| 2 | 32~47 |
| 3 | 48~63 |

TABLE 9

| Preamble sequence set | Preamble sequence set |
|---|---|
| uplink data transmission | 0, 1 |
| downlink data reception | 2, 3 |

TABLE 10

| Preamble sequence set | Preamble sequence set |
|---|---|
| uplink data transmission | 0, 1, 2 |
| downlink data reception | 3 |

That is, the eNB may include index information of a preamble sequence set allocated for the transmission of uplink data and index information of a preamble sequence set allocated for the reception of downlink data in configuration information, and may transmit the configuration information to a UE.

Alternatively, an eNB may include index information of a preamble sequence set allocated for a specific purpose of random access in configuration information, and may transmit the configuration information.

That is, the eNB may include index information of a preamble sequence set allocated for the transmission of uplink data or index information of a preamble sequence set allocated for the reception of downlink data in configuration information, and may transmit the configuration information to a UE.

Alternatively, the eNB may include index information of the start preamble sequence of each of preamble sequence sets allocated for a specific purpose of random access in configuration information, and may transmit the configuration information to a UE.

For example, if preamble sets are classified as in Table 10, an eNB may notify a UE of preamble sequences classified for the transmission of uplink data by including "0", "16" and "32", that is, the indices of start preamble sequences of preamble sequence sets "0", "1" and "2" classified for the transmission of the uplink data in configuration information and transmitting the configuration information to the UE.

Third, if subframes or system frames are classified based on the purpose of random access in the time domain of a channel for random access, an eNB may include index information indicative of a classification method of the subframes or system frames in configuration information, and may transmit the configuration information to a UE.

For example, as shown in FIGS. 21 and 22, a subframe and/or system frame of a channel for random access may be classified based on the purpose of random access.

In this case, an eNB may include index information indicating a configuration method of the classified subframe and/or system frame in configuration information, and may transmit the configuration information to a UE.

Table 11 is a table showing an example of index information indicative of a configuration method of classified subframes and/or system frames.

TABLE 11

| Index | System frame number | Subframe number |
|---|---|---|
| 0 | even | 1 |
| 1 | even | 4 |
| 2 | even | 7 |
| 3 | every | 1 |
| 4 | every | 4 |
| 5 | every | 7 |
| 6 | every | 1, 6 |
| 7 | every | 2, 7 |

As shown in FIG. 21, if a configuration according to the purpose of random access is indicated by an index, a UE may be aware of the configuration (or setting) of subframes and/or system frames according to the purpose of random access through indices received from an eNB, and may perform a random access procedure for data transmission and reception using the random access channels of the configured subframes.

That is, if a random access procedure is performed for the transmission of uplink data, a random access channel for the random access procedure is allocated every No. 1 subframe within an even-numbered system frame based on the index "0" of Table 11.

Furthermore, if a random access procedure is performed for the reception of downlink data, a random access channel for the random access procedure is allocated every No. 4 subframe within an even-numbered system frame based on the index "1" of Table 11.

As shown in FIG. 22, if a system frame or system frame configured based on the purpose of random access is indicated by an index, a UE may be aware of a subframe based on the purpose of random access through an index received from an eNB, and may perform a random access procedure for data transmission and reception through a configured subframe.

FIG. 22(a) shows an example of system frames classified based on the purpose of random access.

As shown in FIG. 22(a), when a UE receives that the configuration of a system frame for the transmission and reception of connectionless based data is an index "7" through configuration information from an eNB, the UE can be aware that the Nos. 2 and 7 subframes of even-numbered system frames are subframes for random access of the transmission objected of uplink data and the Nos. 2 and 7 subframes of odd-numbered system frames are subframes for random access of the transmission objected of downlink data through the index "7" of Table 11.

Alternatively, the UE can be aware that the Nos. 2 and 7 subframes of odd-numbered system frames are subframes for random access of the transmission object of uplink data and the Nos. 2 and 7 subframes of even-numbered system frames are subframes for random access of the transmission object of downlink data.

That is, when the UE performs a random access procedure for the transmission of uplink data, it may perform the random access procedure for the transmission of the uplink data through random access channels allocated to every Nos. 2 and 7 subframes of even-numbered system frames based on the index "7."

Furthermore, if a UE performs a random access procedure for the reception of downlink data, it may perform the random access procedure for the reception of the downlink data through random access channels allocated every Nos. 2 and 7 subframes of odd-numbered system frames based on the index "7."

FIG. 22(b) shows an example of subframes classified based on random access objects.

As shown in FIG. 22 (b), when a UE receives that the configuration of a system frame for the transmission and reception of connectionless based data is an index "7" through configuration information from an eNB, the UE can be aware that the No. 2 subframes of all system frames are subframes for random access of the transmission object of uplink data and the No. 7 subframes of all system frames are subframes for random access of the transmission object of downlink data based on the index "7" of Table 11.

Alternatively, the UE can be aware that the No. 7 subframes of all the system frames are subframes for random access of the transmission object of uplink data and the No. 2 subframes of all the system frames are subframes for random access of the transmission object of downlink data.

That is, when the UE performs a random access procedure for the transmission of uplink data, it may perform the random access procedure for the transmission of the uplink data through random access channels allocated every No. 2 subframes of all the system frames based on the index "7."

Furthermore, when the UE performs a random access procedure for the reception of downlink data, it may perform the random access procedure for the reception of the downlink data through random access channels allocated every No. 7 subframes of all the system frames based on the index "7."

Fourth, if the frequency domain of a random access channel is classified based on a random access object, an eNB may include index information indicative of a classification method of the frequency domain in configuration information and transmit the configuration information to a UE.

For example, as shown in FIGS. 23 and 24, if channels and frequency domains for random access are classified based on random access objects and the subframes of respective allocated channels are configured as in Table 12, an eNB may include index information indicative of a configuration method in configuration information of Table 12, and may transmit the configuration information to a UE.

TABLE 12

| Index | System frame number | Subframe number |
|---|---|---|
| 0 | even | 1 |
| 1 | even | 4 |
| 2 | even | 7 |
| 3 | every | 1 |
| 4 | every | 4 |
| 5 | every | 7 |
| 6 | every | 1, 6 |
| 7 | every | 2, 7 |

FIG. 23 shows an example of frequency domains (channel bands) classified based on random access objects, and FIG. 24 shows an example of channels classified based on random access objects.

A random access UE may receive the configuration information described in FIGS. 20 to 24 from an eNB, and may recognize a preamble according to a random access object, a random access channel in the time domain and/or the configuration of random access channels in the frequency domain. The UE transmits a preamble to the eNB using a resource (a specific preamble set, a random access channel in a specific time domain, a random access channel in a specific frequency domain) classified according to a random access object based on the received configuration information.

The eNB that has received the preamble can be aware of a random access object of the UE through the resource used for the preamble transmission and may differentially allocate an uplink resource to the UE based on the random access object.

FIG. 25 is a flowchart showing an example of a method of receiving resources differentially allocated depending on random access objects of UEs to which the present invention may be applied.

Referring to FIG. 25, an eNB may recognize random access objects of UEs through preambles receives from the UEs and differentially allocate resources to the UEs based on the random access objects.

First, it is assumed that each of a UE 1 and a UE 2 has not established an RRC connection with an eNB, the UE 1 attempts a random access procedure as an object of the transmission of uplink data, and the UE 2 attempts a random access procedure as an object of the reception of downlink data.

Furthermore, it is assumed that the UE 1 and the UE 2 have recognized preamble sets classified based on random access objects, random access channels in the time domain and/or random access channels in the frequency domain through the methods described in FIGS. 20 to 24.

If downlink data to be transmitted to the UE 2 occurs, the eNB transmits a paging message to the UE 2 in order to notify the UE 2 in an idle state that the downlink data to be received by the UE2 is present (S25010)

The paging message includes a UE ID indicative of the UE that receives the downlink data and quality of service (QoS) information indicative of quality that is required for the transmission of the downlink data.

Each of the UE 1 and the UE 2 may perform a random access procedure using a specific preamble set, a random access channel in a specific time domain or a random access channel in a specific frequency region based on a random access object.

For example, if preamble sets are classified as in Table 13 based on random access objects, the UE 1 may select one of preambles for the transmission of uplink data, and the UE 2 may select one of preambles for the reception of downlink data.

TABLE 13

| The purpose of Random access | Preamble sequence index |
|---|---|
| uplink data transmission | 0~31 |
| downlink data reception | 32~63 |

The UE 1 and the UE 2 transmits the selected preambles to the eNB (S25020). The eNB may recognize the random access objects of the UE 1 and the UE 2 through the received preambles. The eNB differentially allocates resources to the UE 1 and the UE 2 based on the recognized random access objects of the UE 1 and the UE 2.

Specifically, if the UE 1 additionally requests resource allocation for the transmission of uplink data and has to transmit the uplink data through the allocated resource, the eNB first allocate the uplink resource enough to transmit a resource request message for transmitting the uplink data to the UE 1 before the UE 2.

Thereafter, the eNB allocates an uplink resource enough to transmit verification information of the UE for the reception of downlink data to the UE 2.

The eNB generates random access response messages including the resources allocated to the respective UEs and the preambles transmitted by the UEs, and transmits the generated random access response messages to the UE 1 and the UE 2 (S25030).

The UE 1 transmits a resource request message to request a resource for the transmission of the uplink data through the resource allocated by the eNB (S25040), and transmits the uplink data to the eNB through the allocated resource.

The UE 2 transmits verification information for the verification of the UE to the eNB through the resource allocated by the eNB (S25050). The eNB transmits downlink data to the UE 2 if the UE 2 is a UE that will receive the downlink data based on the transmitted verification information.

FIG. 26 is a flowchart showing an example of a method for a UE to receive a resource differentially allocated thereto from an eNB based on a random access object of the UE, to which the present invention may be applied.

Referring to FIG. 26, the UE may transmit a preamble to an eNB based on a preamble set, a resource (e.g., channel) on a frequency axis or a resource (e.g., a subframe) on a time axis classified based on a random access object, and may receive a resource differentially allocated thereto for transmitting data or the verification information of the UE from the eNB.

Specifically, the UE (first UE) selects a specific preamble in one of configured preamble sets (S26010), and transmits the selected specific preamble to the eNB through a resource on the frequency axis and a resource on the time axis (S26020).

In this case, the preamble sets, the resource on the frequency axis or the resource on the time axis may be classified based on random access objects of UEs as described in FIGS. 14 to 16 and 20 to 24.

The UE may receive information related to the classified preamble sets, resource on the frequency axis or resource on the time axis through the configuration information described in FIGS. 20 to 24.

For example, if preamble sets are classified based on random access objects, a UE may select a specific preamble in one of the preamble sets based on its own random access object and transmit the specific preamble to an eNB.

If the UE has attempted random access for the reception of downlink data, the UE may receive a paging message, indicating that downlink data that needs to be received from the eNB has occurred, before the UE receives the preamble.

The paging message includes a UE ID indicating the UE that receives the downlink data and quality of service (QoS) information indicating quality that is required for the transmission of the downlink data.

The UE receives a response message including resource information indicating a resource allocated based on its own random access object and the transmitted preamble (S26030).

Thereafter, if the UE attempts to receive the downlink data, the UE may transmit verification information for verifying the UE that receives the downlink data to the eNB through the allocated resource, and may receive the downlink data from the eNB S26040.

If the UE attempts to transmit uplink data to the eNB, the UE transmits the uplink data to the eNB through an allocated resource. However, if the resource allocated by the eNB is not sufficient to transmit the uplink data, the UE transmits a resource request message to request a resource for the transmission of the uplink data to the eNB through the allocated resource.

The UE may transmit the uplink data to the eNB using the resource allocated by the eNB through the resource request message.

Through the method described in FIG. 26, UEs can receive resources differentially allocated by an eNB based on random access objects. If a procedure for the transmission and reception of data is long or the size of uplink data is large through differential resource allocation, the UEs may preferentially receive resources allocated thereto and perform efficient transmission and reception of data.

FIG. 27 is a flowchart showing an example of a method for an eNB to differentially allocate resources to UEs depending on random access objects of UEs to which the present invention may be applied.

Referring to FIG. 27, an eNB may receive multiple different preambles from UEs based on preamble sets, resources (e.g., channels) on a frequency axis or resources (e.g., subframes) on a time axis classified based on random access objects from multiple UEs, and may differentially schedules resources to the multiple UEs.

Specifically, the eNB receives different multiple preambles from the multiple UEs through resources on the frequency axis and resources on the time axis (S27010).

In this case, the multiple different preambles are included in multiple preamble sets, respectively. The multiple preamble sets, resources on the frequency axis or resources on the time axis may be classified based on the random access objects of the UEs as described in FIGS. 14 to 16 and FIGS. 20 to 24.

The eNB may transmit information related to the classified preamble sets, resources on the frequency axis or resources on the time axis to the UE through the configuration information described in FIGS. 20 to 24.

If a UE to which an eNB has to transmit downlink data is present in multiple UEs, the eNB may notify the corresponding UE that the downlink data has occurred by transmitting a paging message to the corresponding U before it receives a preamble.

The paging message includes a UE ID indicative of the UE that receives the downlink data and quality of service (QoS) information indicative of quality that is required for the transmission of the downlink data. The eNB may determine the random access objects of the multiple UEs based on received different multiple preambles, resources on the frequency axis or resources on the time axis in which the different preambles have been transmitted.

The eNB may differentially allocate resources to the multiple UEs based on the random access objects of the multiple UEs (S27020).

Specifically, the eNB may determine the priority of resource allocation based on the random access objects of the multiple UEs and allocate resources to the multiple UEs based on the determined priority.

For example, if the time for data transmission and reception is long or the size of data is great for a reason, such as that multiple steps must be performed in order to transmit and receive data, an eNB may determine the priority of resource allocation to a corresponding UE to be high and preferentially allocate a resource.

The eNB generates response messages, including resource information indicative of the resources respectively allocated to the multiple UEs and the preambles respectively transmitted by the multiple UEs, and transmits the generated response messages to the multiple UEs (S27030).

Thereafter, if the eNB needs to transmit downlink data to the UE, the eNB receives verification information for verifying that the UE is a UE that receives the downlink data through the allocated resource from the UE.

The eNB verifies whether the corresponding UE is a UE that has to receive the downlink data through the received verification information. If the corresponding UE is verified, the eNB may transmit the downlink data to the corresponding UE.

If the UE needs to transmit uplink data to the eNB, the eNB receives the uplink data through an allocated resource from the UE. However, if the resource allocated by the eNB is not sufficient to transmit the uplink data, the eNB receives a resource request message to request a resource for the transmission of the uplink data through the allocated resource from the UE.

The eNB may allocate a resource for transmitting the uplink data to the UE based on the received resource request message, and may receive the uplink data through the allocated resource from the UE (S27040).

Through the method described in FIG. 27, an eNB can differentially allocate resources based on random access objects of UEs. If a procedure for data transmission and reception is long through differential resource allocation or the size of uplink data is great, the eNB first allocates a resource, thereby being capable of efficiently allocating resources.

randomaccessrandomaccess FIG. 28 shows one example of an internal block diagram of a wireless device to which the present invention may be applied.

Here, the wireless device may be an eNB and a UE, and the base station includes both a macro eNB and a small eNB.

As shown in FIG. 28, the eNB 2810 and the UE 2820 include communication units (transmitting/receiving units, RF units, 2813 and 2823), processors 2811 and 2821, and memories 2812 and 2822.

The eNB and the UE may further input units and output units.

The communication units 2813 and 2823, the processors 2811 and 2821, the input units, the output units, and the memories 2812 and 2822 are operatively connected with each other in order to conduct the methods as proposed in the present disclosure.

The communication units (transmitting/receiving units or RF units, 2813 and 2823), when receiving information created from a PHY (Physical Layer) protocol, transfer the received information through RF (Radio-Frequency) spectrums and conduct filtering and amplification, then transmit it through antennas. Further, the communication units transfer RF (Radio Frequency) signals received through the antennas to bands available to be processed in the PHY protocol and perform filtering.

In addition, the communication units may also include the functions of switches to switch transmitting and receiving functions.

The processors 2811 and 2821 implement functions, procedures, and/or methods as proposed in the present disclosure. The layers of radio interface protocols may be implemented by the processors.

The processors may be represented as control parts, controllers, control units, or computers.

The memories 2812 and 2822 are connected with the processors and store protocols or parameters for performing the function, procedure and/or method proposed in the present disclosure.

The processors 2811 and 2821 may include an application-specific integrated circuit (ASIC), a separate chipset, a logic circuit, and/or a data processing unit. The memory may include a read-only memory (ROM), a random access memory (RAM), a flash memory, a memory card, storage medium, and/or other storage devices. The communication unit may include a base-band circuit for processing a radio signal. When the embodiment is implemented in software, the aforementioned methods may be implemented with a module (process, function, etc.) for performing the aforementioned functions.

The module may be stored in the memory and may be performed by the processor. The memory may be located inside or outside the processor, and may be coupled to the processor by using various well-known means.

The output unit (display unit) is controlled by the processor and outputs information from the process, together with various information signals from the processor and key input signals generated from the key input unit.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present invention.

The method for direction-based searching a device proposed in the present disclosure, rather than limited to the configurations and methods according to the above-described embodiments, may be configured so that all or some of the embodiments may be selectively combined with each other to allow for various variations or modifications.

Meanwhile, the method for direction-based searching a device of the present disclosure may be implemented as codes that are readable by a recording medium readable by a process provided in a network device. The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments have been depicted and described so far, but the present disclosure is not limited to the specific embodiment described above. It is understood that various modifications are available by those skilled in the dart without departing from the technical feature of the present invention claimed in claims, and such modifications should not be individually understood from the technical spirit and prospect of the present invention.

Further, both of the method invention and the device invention are described in the present disclosure, and both of the invention may be applied complementarily with each other as occasion demands.

INDUSTRIAL APPLICABILITY

The RRC connection method in the wireless communication system according to the present invention which may be applied to the 3GPP LTE/LTE-A system has been mainly described above. The present disclosure is not limited to this. The RRC connection method in the wireless communication system according to the present invention may be equally applied to various wireless communication systems in addition to the 3GPP LTE/LTE-A system.

What is claimed is:

1. A method for a first UE to transmit and receive data in a wireless communication system, the method comprising:
selecting a specific preamble from a preamble set;
transmitting, to a base station, a request message comprising (i) the selected specific preamble and (ii) information on a size of uplink data or verification information of the first UE through a resource on a frequency axis and a resource on a time axis,
wherein, based on the first UE transmitting the uplink data, the information on the size of the uplink data is included in the request message,
wherein, based on the first UE receiving downlink data from the base station, the information on the size of the verification information is included in the request message, and
wherein at least one of (i) the preamble set, (ii) the resource on the frequency axis or (iii) the resource on the time axis is classified based on whether the first UE transmits the uplink data or receives the downlink data;
receiving, from the base station, a response message comprising resource information representing a resource allocated based on (i) whether the first UE transmits the uplink data to the base station, or (ii) whether the first UE receives the downlink data from the base station,
wherein, based on the first UE transmitting the uplink data, the resource is allocated further based on the information on the size of the uplink data, and
wherein, based on that the first UE receiving the downlink data, the resource is allocated further based on the information on the size of the verification information; and
transmitting, to the base station through the allocated resource, a respective one of (i) the uplink data or (ii) the verification information of the first UE for receiving the downlink data.

2. The method of claim 1, further comprising:
receiving configuration information related to the at least one preamble set, the resource on the frequency axis or the resource on the time axis classified based on whether the first UE transmits the uplink data to the base station or receives the downlink data from the base station.

3. The method of claim 2, wherein if the preamble set is classified based on whether the first UE transmits the uplink data to the base station or receives the downlink data from the base station, the configuration information comprises number information of a preamble included in the preamble set, index information of a start preamble included in the preamble set or index information indicating the preamble set.

4. The method of claim 2, wherein if the resource on the time axis is classified based on whether the first UE transmits the uplink data to the base station or receives the downlink data from the base station, the configuration information further comprises index information indicating the classified resource on the time axis.

5. The method of claim 2, wherein if the resource on the time axis is classified based on whether the first UE transmits the uplink data to the base station or receives the downlink data from the base station, the configuration information further comprises index information indicating the classified resource on the frequency axis.

6. The method of claim 1, wherein the verification information comprises at least one of a UE identifier (ID) for identifying the UE, a type of security header, a key set identifier for identifying security context, an NAS counter or a message authentication code (MAC).

7. A method for a base station to schedule resources in a wireless communication system, the method comprising:
receiving, from multiple UEs, multiple request messages including (i) a preamble selected from a preamble set and (ii) information on a size of one of (i) uplink data or (ii) verification information of a UE through:
a resource on a frequency axis for each of the multiple UEs, and
a resource on a time axis for each of the multiple UEs,
wherein, based on a UE transmitting the uplink data, the information on the size of the uplink data is included in a request message,
wherein, based on the UE receiving downlink data, the information on the size of the verification information is included in the request message, and
wherein at least one of (i) the preamble set, (ii) the resource on the frequency axis or (ii) the resource on the time axis is classified based on whether the UE transmits the uplink data or receives the downlink data;

transmitting, to the multiple UEs, response messages comprising resource information representing a resource allocated based on whether the UE transmits the uplink data or receives the downlink data, respectively, wherein, based on the UE transmitting the uplink data, the resource is allocated further based on the information on the size of the uplink data, and wherein, based on the UE receiving the downlink data, the resource is allocated further based on the information on the size of the verification information; and receiving, from the multiple UEs through resources allocated to each of the multiple UEs, (i) the uplink data of the multiple UEs or (ii) the verification information for a verification of the multiple UEs.

8. The method of claim 7, further comprising:

based on the preamble, determining, for each of the multiple UEs, whether the UE transmits the uplink data to the base station or receives the downlink data from the base station, the resource on the frequency axis and the resource on the time axis.

9. The method of claim 7, further comprising:

determining, for each of the multiple UEs, resource allocation priority based on whether the UE transmits the uplink data to the base station or receives the downlink data from the base station; and allocating respective ones of the resource on the frequency axis and the resource on the time axis to the multiple UEs based on the determined resource allocation priority.

10. The method of claim 7, further comprising:

transmitting configuration information related to the preamble set, the resource on the frequency axis or the resource on the time axis classified based on whether the UE transmits the uplink data to the base station or receives the downlink data from the base station.

11. A first user equipment (UE) for transmitting and receiving data in a wireless communication system, the first UE comprising:

a transceiver; and a processor configured to:

select a specific preamble from a preamble set;

transmit, to a base station, a request message comprising (i) the selected specific preamble and (ii) information on a size of uplink data or verification information of the first UE through a resource on a frequency axis and a resource on a time axis, wherein, based on the first UE transmitting the uplink data, the information on the size of the uplink data is included in the request message, wherein, based on the first UE receiving downlink data from the base station, the information on the size of the verification information is included in the request message, and wherein at least one of (i) the preamble set, (ii) the resource on the frequency axis or (iii) the resource on the time axis is classified based on whether the first UE transmits the uplink data or receives the downlink data;

receive, from the base station, a response message comprising resource information representing a resource allocated based on (i) whether the first UE transmits the uplink data to the base station, or (ii) whether the first UE receives the downlink data from the base station, wherein, based on the first UE transmitting the uplink data, the resource is allocated further based on the information on the size of the uplink data, and wherein, based on that the first UE receiving the downlink data, the resource is allocated further based on the information on the size of the verification information; and transmit, to the base station through the allocated resource, a respective one of (i) the uplink data or (ii) the verification information of the first UE for receiving the downlink data.

* * * * *